US012668899B1

(12) United States Patent
Pedersen et al.

(10) Patent No.: US 12,668,899 B1
(45) Date of Patent: Jun. 30, 2026

(54) WOVEN GEOMETRIC TEXTILE MATERIAL WITH ULTRA LOW SOLID FRACTION, APPARATUS AND METHOD OF MAKING

(71) Applicant: Kimre, Inc., Homestead, FL (US)

(72) Inventors: George C. Pedersen, Cutler Bay, FL (US); George C. Pedersen, Jr., Coral Gables, FL (US)

(73) Assignee: Kimre, Inc., Homestead, FL (US)

( * ) Notice: Subject to any disclaimer, the term of this patent is extended or adjusted under 35 U.S.C. 154(b) by 0 days.

(21) Appl. No.: 19/420,686

(22) Filed: Dec. 15, 2025

(51) Int. Cl.
| | |
|---|---|
| *D03D 13/00* | (2006.01) |
| *B01D 39/16* | (2006.01) |
| *D03C 13/00* | (2006.01) |
| *D03D 5/00* | (2006.01) |
| *D03D 9/00* | (2006.01) |
| *D03D 15/283* | (2021.01) |
| *D03D 15/33* | (2021.01) |

(Continued)

(52) U.S. Cl.
CPC ....... *D03D 13/004* (2013.01); *B01D 39/1623* (2013.01); *D03C 13/00* (2013.01); *D03D 5/00* (2013.01); *D03D 9/00* (2013.01); *D03D 15/283* (2021.01); *D03D 15/33* (2021.01); *D03D 25/005* (2013.01); *D06C 7/00* (2013.01); *B01D 2239/0613* (2013.01); *B01D 2239/10* (2013.01); *D10B 2321/022* (2013.01); *D10B 2401/02* (2013.01); *D10B 2505/04* (2013.01)

(58) Field of Classification Search
CPC .......... D03D 13/004; D03D 5/00; D03D 9/00; D03D 15/283; D03D 15/33; D03D 25/005; B01D 39/1623; B01D 2239/0613; B01D 2239/10; D03C 13/00; D06C 7/00; D10B 2321/022; D10B 2401/02; D10B 2505/04

USPC ................................. 210/435; 442/181, 189
See application file for complete search history.

(56) References Cited

U.S. PATENT DOCUMENTS

| | | | |
|---|---|---|---|
| 4,022,596 | A | 5/1977 | Pedersen |
| 4,086,070 | A | 4/1978 | Argo et al. |
| 4,929,398 | A | 5/1990 | Pedersen |

(Continued)

FOREIGN PATENT DOCUMENTS

| | | | | |
|---|---|---|---|---|
| AU | 2007248358 | B2 | 11/2007 | |
| CN | 107366273 | A * | 11/2017 | ............. E02D 3/005 |

(Continued)

OTHER PUBLICATIONS

Machine-generated English translation of CN 213652790, generated on Mar. 13, 2026.*

(Continued)

*Primary Examiner* — Fred Prince
(74) *Attorney, Agent, or Firm* — Farber LLC; Fritz L. Schweitzer, III

(57) ABSTRACT

A woven geometric textile material has a body portion having a plurality of weft strands woven with a plurality of warp strands comprising thermoplastic strands, the body portion comprising a body weave having a plurality of repeating weave patterns in a grid of patterns, each weave pattern including at least 44 body warp strands and at least 44 weft strands and the body portion having a solid fraction of less than 3 percent. A separator media comprising the textile material and a separator device employing the separator media are disclosed. A loom for making the textile material and method of making the textile material is disclosed.

25 Claims, 15 Drawing Sheets

(51) Int. Cl.
    *D03D 25/00*       (2006.01)
    *D06C 7/00*       (2006.01)

(56)         References Cited

U.S. PATENT DOCUMENTS

| | | | |
|---|---|---|---|
| 5,605,748 | A | 2/1997 | Kennedy |
| 7,416,576 | B2 | 8/2008 | Ziebold et al. |
| 8,632,616 | B2 | 1/2014 | Azwell et al. |
| 2006/0150594 | A1 | 7/2006 | Ziebold et al. |
| 2010/0248574 | A1* | 9/2010 | King ..................... E02D 17/202 |
| | | | 442/205 |
| 2011/0056381 | A1 | 3/2011 | Azwell et al. |
| 2015/0159305 | A1* | 6/2015 | Booth .................. E02D 17/202 |
| | | | 442/189 |
| 2016/0136554 | A1 | 5/2016 | Swaminathan |
| 2017/0354907 | A1* | 12/2017 | Ray ....................... D03D 15/37 |
| 2019/0366678 | A1* | 12/2019 | Jones ..................... E02D 17/20 |
| 2020/0030728 | A1* | 1/2020 | Ray ....................... D03D 15/47 |
| 2020/0155991 | A1 | 5/2020 | Goris |
| 2024/0299870 | A1 | 9/2024 | Harris |
| 2025/0243611 | A1* | 7/2025 | Yee ..................... D03D 15/283 |

FOREIGN PATENT DOCUMENTS

| | | | | | |
|---|---|---|---|---|---|
| CN | 213652790 | U | * | 7/2021 | ........... D03D 13/004 |
| KR | 101193150 | B1 | * | 10/2012 | ............. D03D 11/02 |

OTHER PUBLICATIONS

Machine-generated English translation of CN 107366273, generated on Mar. 13, 2026.*

Machine-generated English translation of KR 101193150, generated on Mar. 13, 2026.*

* cited by examiner

Weft

Warp

18

16

Weft

Warp

WOVEN GEOMETRIC TEXTILE MATERIAL WITH ULTRA LOW SOLID FRACTION, APPARATUS AND METHOD OF MAKING

FIELD OF THE INVENTION

The invention pertains to the field of textiles and, in particular, woven geometric textiles for industrial applications.

BACKGROUND OF THE INVENTION

Separation systems are widely employed in industrial processes to separate particulate or liquid contaminants or components from process streams. In many applications, a separation media is utilized within a separator device to capture and coalesce entrained material, allowing a cleaned gas or liquid stream to pass through. The separation media may take a variety of forms, including randomly oriented mats of fibers, nonwoven layers, or woven media.

The manufacture of woven separation media may involve the use of a loom apparatus capable of producing textiles with controlled patterns, strand spacing, and tension. After weaving, the separation media may undergo a heat treatment process to alter material properties, such as shape, dimensional stability, and mechanical strength. In some cases, woven separation media includes a selvedge along its edges for example to prevent fraying during manufacturing and for material handling; this selvedge can be removed and the media subsequently cut to the required size for use.

Woven separation media produced in this manner can be adapted for use in a wide variety of filtration, separation, and fluid-handling applications, including chemical processing, food and beverage production, pharmaceutical manufacturing, and environmental control systems.

In certain industrial processes-such as the production of sulfuric acid-separators are employed to remove fine liquid aerosols from gas streams before those gases are released or further processed. In such processes, the efficiency of the separation media plays a critical role in both process performance and operating cost. A low solid fraction (or, conversely, a high void fraction) of the separation media can reduce the resistance to gas flow, thereby decreasing the pressure drop across the media. This reduction in pressure drop can improve energy efficiency by lowering the power required to move gases through the media.

Capacity is an important characteristic for separation media. In a mist eliminator for example the flow capacity refers to the maximum gas flow rate (e.g., ft/sec or m/sec) that can be processed through the separation media while maintaining efficient separation and stable operation. This capacity depends not only on the physical characteristics of the separation media-such as void fraction, fiber size, thickness, and orientation—but also on the liquid load and liquid viscosity of the incoming gas stream.

The liquid load represents the amount of entrained liquid (aerosol or mist) carried by the gas stream, typically expressed as a mass of liquid per unit volume of gas (e.g., $kg/m^3$ or $lb/ft^3$), or as a ratio of mass of liquid to mass of gas (e.g., kg(liquid)/kg(gas)). Higher liquid loads increase the amount of liquid that must be captured and drained through the media. As the liquid load rises, more liquid accumulates on the fibers or within the media, increasing the liquid hold-up and decreasing the available free volume for gas flow.

As gas flows through the separation media, droplets are captured and coalesce into larger droplets, which drain downward under gravity. The separation media must simultaneously permit gas flow and liquid drainage. When gas velocity increases, drag forces acting on the collected liquid rise, opposing gravity.

Superficial gas velocity is the hypothetical speed of a gas flowing through a cross-sectional area by dividing the volumetric flow rate by the total cross-sectional area.

If the gas flow rate exceeds the medium's ability to drain liquid, liquid begins to accumulate within the media, leading to flooding. The flooding velocity for a given liquid load is the superficial gas flow rate at which this accumulation becomes self-sustaining—that is, when liquid hold-up in the media sharply increases and drainage efficiency collapses. Beyond this point, the media becomes saturated, pressure drop rises steeply, and re-entrainment of liquid into the gas stream occurs.

The flooding velocity is generally recognized as the condition where pressure drop increases rapidly and disproportionately (often exponentially) with increasing velocity. Common indicators of flooding velocity can include a sharp rise in pressure drop (e.g., 2-4 times), visible liquid accumulation at a pad base, re-entrainment of the liquid phase, audible and/or visible vibration or "chatter" in the separator vessel, and decreased mist removal.

For a given separation media and liquid load, the flooding velocity varies (inversely) with the liquid load of the gas stream. In other words, for a given separation media, when the liquid load increases, the flooding velocity decreases, and when the liquid load decreases, the flooding velocity increases.

The use of separation media with a higher flooding velocity permits a separator system to operate at higher gas velocities and/or reduced size while maintaining a lower pressure drop. This directly results in lower capital cost and more compact equipment.

Operating a separator system at or above the flooding velocity can result in re-entrainment as well as unstable and potentially damaging or dangerous conditions, including to downstream equipment. Therefore, in practice, the gas flow velocity is typically limited to a fraction of the flooding velocity—commonly 60-80% of the flooding velocity—to ensure stable performance and effective drainage.

A current flooding level for a given separation media and liquid load is typically reported as a percentage of the flooding velocity for such media and liquid load (% Flooding Level). This represents the current gas velocity relative to the theoretical velocity at which flooding begins. It can be calculated as:

$$\% \text{ Flooding Level} = (\text{Actual gas velocity}/\text{Flooding velocity}) \times 100$$

In separator operations, and particularly large-scale processes, improvements in capacity and power efficiency can yield substantial cost savings and enhance production quality.

Therefore, there is a need for industrial separation media with reduced solid fraction and improved structure that exhibits an increased liquid handling capacity and resistance to fouling and reduced power requirements while maintaining high capture efficiency, thereby improving process efficiency in large-scale industrial separator systems, and there is a need for apparatuses for making such media, and improved methods of operating such apparatuses.

SUMMARY OF THE INVENTION

The present disclosure is intended to meet at least the above-described needs and to provide further improvements to separation media and separator devices, particularly for use in industrial processes.

It is an object of the present disclosure to provide a separation media suitable for industrial processes that exhibits an ultra-low solid fraction.

It is an object of the present disclosure to provide a separation media suitable for industrial processes that exhibits an increased liquid handling capacity and fouling resistance while maintaining high capture efficiency, thereby improving process efficiency in large-scale industrial separator systems.

It is a further object of the present disclosure to provide separation devices employing the separation media of the present disclosure for industrial processes that exhibit an increased liquid handling capacity and fouling resistance while maintaining high capture efficiency, thereby improving process efficiency in large-scale industrial separator systems.

It is a further objection of the present disclosure to provide improved apparatus for making separation media for industrial processes that exhibits an ultra-low solid fraction and reduced pressure drop while maintaining high capture efficiency, thereby improving process efficiency in large-scale industrial separator systems.

It is a further object of the present disclosure to provide improved methods of operating apparatus for making separation media for industrial processes that exhibits an ultra-low solid fraction and a reduced pressure drop while maintaining high capture efficiency, thereby improving process efficiency in large-scale industrial separator systems.

These and other objects are achieved by a woven geometric textile suitable for industrial processes and having an ultra-low solid fraction of less than 3 percent. The invention comprises such textiles, apparatuses for making such textiles, methods of operating of such apparatuses to produce the textiles, separator media comprising or consisting of such textiles, and separator devices employing such separator media.

The disclosed woven geometric textiles can have an ultra-low solid fraction and are designed to provide exceptional performance in industrial applications where low resistance to fluid flow and high separator efficiency are desired. The low solid fraction (or correspondingly high void fraction) enables higher resistance to fouling and liquid handling capacity across the separation media, translating to improved process efficiency, lower energy consumption, longer service life and enhanced throughput. Such characteristics are especially valuable in large-scale industrial operations, where even incremental gains in efficiency and systems can yield substantial cost savings and improvements in product quality. Suitable materials for forming the woven textile include thermoplastic materials such as polypropylene, which offer favorable chemical resistance and durability, as well as other polymers or synthetic fibers tailored to the intended use environment.

The woven geometric textiles having an ultra-low solid fraction can comprise a plurality of thermoplastic strands or polymeric strands (e.g., polypropylene, PVDF, ETFE, ECTFE, PFA, CTFE and PPH, or other suitable monofilament or multifilament synthetic fibers) interlaced in a geometric weave pattern configured to provide a solid fraction of less than 3 percent. The textile can have an optional selvedge along opposing lateral edges for stability during production. A post-weave heat-treatment can be used for structure and dimensional stability.

The apparatuses for producing the woven textiles can include a loom specifically configured to weave strands in a geometric pattern that yields the ultra-low solid fraction structure. This loom can accommodate a range of strand materials and diameters and can produce woven structures with optional selvedges for edge stabilization during fabrication.

The loom apparatus configured to produce the woven geometric textile can include a strand supply system configured to deliver a plurality of strands to a weaving zone, a weaving mechanism adapted to interlace the strands into a geometric pattern yielding an ultra-low solid fraction structure, optional selvedge-forming mechanisms, and control systems for adjusting weave geometry, strand spacing, and tension to achieve desired void fraction.

A method of making a woven geometric textile having an ultra-low solid fraction can include providing a plurality of polymeric strands, operating the loom to interlace the strands into the geometric weave pattern; forming optional selvedges along opposing edges of the woven textile; subjecting the woven textile to a heat treatment process to stabilize the structure, removing selvedges after heat treatment, and cutting the textile to desired size for use as separation media.

The method of making the woven textile involves operating the loom to interlace the strands according to the desired geometric pattern, followed by optional post-weaving processes such as heat treatment to stabilize the material structure, removal of selvedges, and cutting to final size. These steps can be adapted for different applications, including but not limited to mist eliminators for sulfuric acid production, chemical processing, food manufacturing, and environmental control systems.

As referenced above, the invention encompasses a set of related aspects directed to improved woven textiles, separator media incorporating such woven structures, separator devices employing the separator media, loom apparatuses for making the woven textiles, and associated methods of making the woven textiles. The various aspects described herein may be practiced individually or in combination unless clearly incompatible.

More specifically, in a first aspect, the disclosure provides a woven geometric material. In embodiment 1 of the first aspect, the woven geometric material comprises a woven geometric textile material having an ultra-low solid fraction, the woven geometric textile material comprising first and second sides, a width between the first and second sides and a length parallel to the first and second sides; a plurality of weft strands woven with a plurality of warp strands, the plurality of weft strands extending between the first and second sides, and the plurality of warp strands extending along the length of the material; the plurality of weft and warp strands comprising thermoplastic strands; the plurality of warp strands including a set of body warp strands; a body portion disposed between the first and second sides, the body portion comprising a body weave including the body warp strands woven with the plurality of weft strands; the body weave comprising a plurality of repeating weave patterns in a grid of patterns having a plurality of rows of the repeating weave patterns across the width of the material and a plurality of columns of the repeating patterns along the length of the material; each weave pattern of the plurality of repeating weave patterns including at least 44 body warp strands and at least 44 weft strands; and the body portion having a solid fraction of less than 3 percent.

In embodiment 2, the woven geometric material of embodiment 1 of the first aspect has a solid fraction of less than 2.7 percent.

In embodiment 3, the woven geometric material of embodiment 1 of the first aspect has a solid fraction of less than 2.6 percent.

In embodiment 4, the woven geometric material of embodiment 1 of the first aspect has a solid fraction of less than 2.5 percent.

In embodiment 5, in the woven geometric material of any one or any combination of embodiments 1-4 of the first aspect, the plurality of weft and warp strands consist of polypropylene.

In embodiment 6, the woven geometric textile material of any one or any combination of embodiments 1-5 of the first aspect further comprises each of the plurality of repeating weave patterns shares a body warp strand with a first adjoining repeating weave pattern and shares a weft strand with a second adjoining repeating weave pattern.

In embodiment 7, the woven geometric textile material of any one or any combination of embodiments 1-6 of the first aspect further comprises the plurality of repeating weave patterns have an identical weave pattern.

In embodiment 8, the woven geometric textile material of any one or any combination of embodiments 1-7 of the first aspect further comprises first and second selvedges, and the body portion being disposed between the first and second selvedges; each selvedge having an inner selvedge cord and an outer selvedge cord, and the inner and outer selvedge cords extending along the length of the material; the plurality of warp strands including a first set of selvedge warp strands disposed between the inner and outer selvedge cords of the first selvedge, and including a second set of selvedge warp strands disposed between the inner and outer selvedge cords of the second selvedge; each selvedge having a selvedge weave comprising the plurality of weft strands woven with the associated inner and outer selvedge cords and the associated first and second sets of selvedge warp strands; the outer selvedge cord of each selvedge being disposed along a lateral edge of the material and the inner selvedge cord of each selvedge being disposed inwardly from the associated outer selvedge cord; the inner selvedge cord of each selvedge having a diameter equal to or more than 1.5 times greater than the plurality of body warp strands; and a spacing between adjacent selvedge warp strands of the first and second sets of selvedge warp strands being greater than a spacing between the plurality of body warp strands.

In embodiment 9, the woven geometric textile material of any one or any combination of embodiments 1-8 of the first aspect further comprise the selvedge weave of each selvedge comprising a plain weave and having a first thickness; the body portion having a second thickness substantially greater than the first thickness of the selvedge weave; and a diameter of the inner selvedge cord of each selvedge being between the first thickness and the second thickness.

In embodiment 10, the woven geometric textile material of any one or any combination of embodiments 1-9 of the first aspect further comprises a distance between the inner selvedge cord of each selvedge and a closest body warp strand being substantially greater than a spacing between the plurality of body warp strands, wherein a gap is formed between the inner selvedge cord of each selvedge and the body weave.

In embodiment 11, the woven geometric textile material of any one or any combination of embodiments 1-10 of the first aspect further comprises the inner selvedge cord having a rough exterior surface relative to the weft strands.

In embodiment 12, the woven geometric textile material of any one or any combination of embodiments 1-11 of the first aspect further comprise the inner and outer selvedge cords being a color contrasting with the warp strands and weft strands.

In embodiment 13, the woven geometric textile material of any one or any combination of embodiments 1-12 of the first aspect further comprises the body being a geometric mesh structure; the geometric mesh structure comprising a woven material of a waffle-weave construction comprising repeating groups of first and second sets of strands; the first set of strands comprising generally parallel strands which extend in substantially straight fashion in one predetermined direction; each repeating group of strands of the first set being arranged in a generally saw-tooth cross sectional configuration whereby a thickness of the woven material is substantially equal to a height of the saw-tooth cross sectional configuration; each repeating group of strands of the second set being arranged in a generally saw-tooth cross sectional configuration intersecting at right angles with the strands of the first set.

In embodiment 14, the woven geometric textile material of any one or any combination of embodiments 1-13 of the first aspect further comprises the body portion comprising a geometric mesh structure; the geometric mesh structure comprising a woven material having a first set of generally parallel strands extending in substantially straight fashion in one predetermined direction and a second set of strands extending at right angles to the predetermined direction; the strands of said first set being arranged in a repeating two-dimensional cross sectional geometric pattern in which strands at the extremes of the pattern define a fabric thickness which is a multiple of at least about 44 of a diameter of a strand; the strands of the second set also being arranged in a repeating two-dimensional cross sectional geometric pattern intersecting with the strands of the first set; the strands of the second set, at the extremes of the geometric pattern thereof, additionally defining a material thickness which is a multiple of at least about 44 of a diameter of a strand; the strands of the second set extending in substantially straight manner in regions between contact with strands of the first set; and the intersecting strands of the first and second sets forming a substantially non-nestable construction.

In embodiment 15, the woven geometric textile material of any one or any combination of embodiments 1-14 of the first aspect further comprises the body portion comprising a geometric mesh structure comprising a first set of strands of material and a second set of strands of material; each strand of the first set being substantially straight and parallel to every other strand in the first set; each strand of the first set being spaced from every other strand in the first set both vertically and horizontally; the second set of strands of material being interleaved with the first set, each of the strands of the second set being substantially parallel to every other strand in the second set; the strands of the first set being perpendicular to the strands of the second set; the lengths of each strand of the second set extending in interleaved fashion through the strands of the first set in a geometric orientation to fit vertical and horizontal offset spacing of each strand in the first set; each of the strands of the second set including a plurality of substantially straight-line portions connected at angles to provide the geometric orientation; and the geometric orientation of the second set and the offset spacing of the first set giving the geometric mesh structure a thickness in cross section substantially greater than a diameter of the strands of the first and second sets of strands.

In embodiment 16 (which can be combined with any one or any combination of embodiments 1-15 of the first aspect), a woven geometric textile material having an ultra-low solid fraction, the material comprises first and second sides, a width between the first and second sides and a length parallel to the first and second sides; a plurality of weft strands woven with a plurality of warp strands, the plurality of weft strands extending between the first and second sides, and the plurality of warp strands extending along the length of the material; the plurality of weft and warp strands comprising thermoplastic strands; the plurality of warp strands including a set of body warp strands; a body portion disposed between the first and second sides, the body portion comprising a body weave including the body warp strands woven with the plurality of weft strands; the body weave comprising a plurality of repeating weave patterns in a grid of patterns having a plurality of rows of the repeating weave patterns across the width of the material and a plurality of columns of the repeating patterns along the length of the material; each weave pattern of the plurality of repeating weave patterns including at least 44 body warp strands and at least 44 weft strands; and the woven geometric textile material having a flooding velocity at or above a flooding velocity profile defined by Formula 1 (published by Kister and Gill) where the solid fraction associated with the flooding velocity profile is at or less than 3% which corresponds to a void fraction (ε) at or greater than 0.97, at least in a liquid load (L) range of a gas stream of 0.001 to 0.03 m3/m2-s;

where Formula 1 is:

$$V_f = 0.144 \varepsilon^{2.3} d_f^{-0.071} (1 + 3.1L^{0.5})^{-1} \sqrt{\frac{\rho_L - \rho_V}{\rho_V}}$$

wherein:

$V_f$ is the flooding velocity of the woven geometric textile material;

ε is the void fraction of the woven geometric textile material;

$d_f$ is a diameter of the warp and weft strands comprising the woven geometric textile material;

L is the liquid loading of the gas stream;

ρL is a density of a liquid phase of the gas stream; and

ρV is a density of a gas phase of the gas stream.

Alternatively, Kister & Gill also expressed the flooding capacity factor as a function of fiber diameter, void fraction and liquid load in a simplified empirical form (from Kister and Gill, "Mist Elimination in Distillation Columns," Trans IChemE, 1992) as:

$$C_f = 0.144 \varepsilon^{2.3} d_f^{-0.071} (1 + 3.1L^{0.5})^{-1}$$

In embodiment 17, the woven geometric textile material of any one or any combination of embodiments 1-16 of the first aspect further comprises the woven geometric textile material having a fiber diameter of 0.00095 meters; and the woven geometric textile material having a flooding velocity at or above a flooding velocity profile defined by Formula 1, where the solid fraction associated with the flooding velocity profile is at or less than 3% which corresponds to a void fraction (ε) associated with the flooding velocity profile is at or greater than 0.97, at least in a liquid load (L) range of 0.001 to 0.03 m³/m²-s and where the gas stream is an air-water mixture at ambient temperature and pressure such that the density of the gas and liquid phases are about 1.204 kg/m³ and 1000 kg/m³, respectively.

In embodiment 18, the woven geometric textile material of any one or any combination of embodiments 1-17 of the first aspect further comprises the solid fraction associated with the flooding velocity profile is at or less than 2.7% which corresponds to a void fraction (ε) associated with the flooding velocity profile is at or greater than 0.973.

In embodiment 19, the woven geometric textile material of any one or any combination of embodiments 1-18 of the first aspect further comprises the solid fraction associated with the flooding velocity profile is at or less than 2.6% which corresponds to a void fraction (ε) associated with the flooding velocity profile is at or greater than 0.974.

In embodiment 20, the woven geometric textile material any one or any combination of embodiments 1-19 of the first aspect further comprises the solid fraction associated with the flooding velocity profile is at or less than 2.5% which corresponds to a void fraction (ε) associated with the flooding velocity profile is at or greater than 0.975.

In embodiment 21, the woven geometric textile material of any one or combination of embodiments 1-20 of the first aspect further comprises the body being a geometric mesh structure; the geometric mesh structure comprising a woven material of a waffle-weave construction comprising repeating groups of first and second sets of strands; the first set of strands comprising generally parallel strands which extend in substantially straight fashion in one predetermined direction; each repeating group of strands of the first set being arranged in a generally saw-tooth cross sectional configuration whereby a thickness of the woven material is substantially equal to a height of the saw-tooth cross sectional configuration; each repeating group of strands of the second set being arranged in a generally saw-tooth cross sectional configuration intersecting at right angles with the strands of the first set.

In embodiment 22, the woven geometric textile material of any one or any combination of embodiments 1-21 of the first aspect further comprises the body portion comprising a geometric mesh structure; the geometric mesh structure comprising a woven material having a first set of generally parallel strands extending in substantially straight fashion in one predetermined direction and a second set of strands extending at right angles to the predetermined direction; the strands of said first set being arranged in a repeating two-dimensional cross sectional geometric pattern in which strands at the extremes of the pattern define a fabric thickness which is a multiple of at least about 44 of a diameter of a strand; the strands of the second set also being arranged in a repeating two-dimensional cross sectional geometric pattern intersecting with the strands of the first set; the strands of the second set, at the extremes of the geometric pattern thereof, additionally defining a material thickness which is a multiple of at least about 44 of a diameter of a strand; the strands of the second set extending in substantially straight manner in regions between contact with strands of the first set; and the intersecting strands of the first and second sets forming a substantially non-nestable construction.

In embodiment 23, the woven geometric textile material of any one or combination of embodiments 1-22 of the first aspect further comprises the body portion comprising a geometric mesh structure comprising a first set of strands of material and a second set of strands of material; each strand of the first set being substantially straight and parallel to every other strand in the first set; each strand of the first set being spaced from every other strand in the first set both vertically and horizontally; the second set of strands of material being interleaved with the first set, each of the strands of the second set being substantially parallel to every other strand in the second set; the strands of the first set being perpendicular to the strands of the second set; the lengths of each strand of the second set extending in interleaved fashion through the strands of the first set in a geometric orientation to fit vertical and horizontal offset spacing of each strand in the first set; each of the strands of the second set including a plurality of substantially straight-line portions connected at angles to provide the geometric orientation; and the geometric orientation of the second set and the offset spacing of the first set giving the geometric mesh structure a thickness in cross section substantially greater than a diameter of the strands of the first and second sets of strands.

In a second aspect, the disclosure provides a separation media for use in a separation device, the separation media comprising the woven geometric textile material of the first aspect of the disclosure.

In embodiment 1 of the second aspect of the disclosure, the separation media comprises the woven geometric textile material according to any one or any combination of embodiments 1-23 of the first aspect of the disclosure.

In a third aspect, the disclosure provides a separation device employing the separation media of the second aspect of the disclosure.

In embodiment 1 of the third aspect of the disclosure, the separation device comprises a vessel; and the separation media of embodiment 1 of the separation media of the second aspect of the disclosure.

In a fourth aspect, the disclosure provides a loom operable to make a woven geometric textile material.

In embodiment 1 of the fourth aspect of the disclosure, the loom comprises the loom being operable to weave a woven geometric textile material having first and second sides; a width between the first and second sides and a length parallel to the first and second sides; a plurality of weft strands woven with a plurality of warp strands, the plurality of weft strands extending between the first and second sides, and the plurality of warp strands extending along the length of the material; the plurality of weft and warp strands comprising thermoplastic strands; the plurality of warp strands including a set of body warp strands; a body portion disposed between the first and second sides, the body portion comprising a body weave including the body warp strands woven with the plurality of weft strands; the body weave comprising a plurality of repeating weave patterns in a grid of patterns having a plurality of rows of the repeating weave patterns across the width of the material and a plurality of columns of the repeating patterns along the length of the material; and each weave pattern of the plurality of repeating weave patterns including at least 44 body warp strands and at least 44 weft strands; the loom having a front and a rear; a let-up roller system disposed at the rear of the loom and operable to dispense a set of warp strands including the plurality of body warp strands; a set of harnesses disposed forwardly of the let-up roller system; the set of harnesses including at least 23 body harnesses; and the at least 23 body harnesses including one body harness operable for controlling one body warp strand for each of the plurality of repeating weave patterns of the body weave, a set of at least 21 body harnesses operable for controlling pairs of body warps for each of the plurality of repeating weave patterns of the body weave, and another one body harness operable for controlling another one body warp strand for each of the plurality of repeating weave patterns of the body weave.

In embodiment 2, the loom of embodiment 1 of the fourth aspect further comprises each harness of the set of harnesses having a plurality of heddles and each heddle having an eye operable to receive and guide a warp; the set of harnesses including a forwardmost harness and a rearmost harness; each harness of the set of harnesses being operable to move between an upper position and a lower position; when each harness of the set of harnesses is in the upper position, a vertical position of the eyes of each harness increasing in a direction toward the rear of the loom; a vertical displacement between an eye of the heddle of the forwardmost harness in the lower position and the eye of the heddle of the rearmost harness in the upper position being at least 6 inches.

In embodiment 3, the loom of any one or any combination of embodiments 1-2 of the fourth aspect further comprises a lay disposed forwardly of the set of harnesses and having a reed with a plurality of dents forming a plurality of warp guides there between and operable to receive at least one of the plurality of body warp strands, the lay being operable to pivot from a rear position to a forward position, and in the forward position the lay being operable to beat a weft at a fell of the material; the lay having a warp support disposed between the reed and the set of harnesses, the warp support being disposed adjacent a bottom portion of the reed, and the warp support comprising a polished top surface and being operable to support the body warp strands.

In embodiment 4, the loom of any one or any combination of embodiments 1-3 of the fourth aspect further comprises a hold-down bar disposed forwardly of the lay in the forward position, the hold-down bar being operable to exert a compressive force on a top surface the material made by the loom at the fell of the material across a width of the material, to compress the material; the hold-down bar having a contact surface having a convex profile and operable to contact a top surface of the material made by the loom; a take-up system disposed forwardly of the hold-down bar and being operable to roll up the material.

In embodiment 5, the loom of any one or any combination of embodiments 1-4 of the fourth aspect further comprises the woven geometric textile material further comprises first and second selvedges, and the body portion being disposed between the first and second selvedges; each selvedge having an inner selvedge cord and an outer selvedge cord, and the inner and outer selvedge cords extending along the length of the material; the plurality of warp strands including a first set of selvedge warp strands disposed between the inner and outer selvedge cords of the first selvedge, and including a second set of selvedge warp strands disposed between the inner and outer selvedge cords of the second selvedge; each selvedge having a selvedge weave comprising the plurality of weft strands woven with the associated inner and outer selvedge cords and the associated first and second sets of selvedge warp strands; the outer selvedge cord of each selvedge being disposed along a lateral edge of the material and the inner selvedge cord of each selvedge being disposed inwardly from the associated outer selvedge cord; the inner selvedge cord of each selvedge having a diameter equal to or more than 1.5 times greater than the plurality of body warp strands; and a spacing between adjacent selvedge warp strands of the first and second sets of selvedge warp strands being greater than a spacing between the plurality of body warp strands; and the loom further comprises a selvedge weaving system operable to weave the inner and outer selvedge cords and the selvedge warp strands of the first and second selvedges with the weft strands.

In embodiment 6, the loom of any one or any combination of embodiments 1-5 of the fourth aspect further comprises the selvedge weaving system including at least 2 selvedge harnesses, and the set of harnesses including the at least 2 selvedge harness; the at least 2 selvedge harnesses being operable for controlling the inner and outer selvedge cords and the selvedge warp strands of the first and second selvedges; the let-up roller system being operable to dispense the selvedge warp strands; and a selvedge cord spindle system disposed at the rear of the loom and operable to dispense the inner and outer selvedge cords.

In embodiment 7, the loom of any one or any combination of embodiments 1-6 of the fourth aspect further comprises the set of harnesses including a second forwardmost harness disposed rearwardly of and adjacent the forwardmost harness; the at least 2 selvedge harnesses including the forwardmost and second forwardmost harnesses; and the rearmost harness being one of the at least 23 body harnesses.

In embodiment 8, the loom of any one or any combination of embodiments 1-7 of the fourth aspect further comprises when each harness of the set of harnesses is in the upper position, the vertical position of the eyes of each harness increasing in a direction toward the rear of the loom, in a linear manner.

In a fifth aspect, the disclosure provides a method of making a woven geometric textile.

In embodiment 1 of the fifth aspect, the method of making a woven geometric textile material comprises providing a loom; operating the loom to produce a pre-heat-treated woven material; providing a heat treatment apparatus operable to heat treat the pre-heat-treated woven material; feeding the pre-heat-treated woven material into the heat treatment apparatus; and heat-treating the pre-heat-treated woven material at least once, the step of heat-treating including heating the pre-heat-treated woven material at a predetermined temperature and for a predetermined duration such that the strand material at least reaches its shrinkage temperature, to produce a post-heat-treated woven material; the post-heat-treated material comprising the woven geometric material of any one or any combination of embodiments 1-23 of the first aspect of the disclosure; and the loom comprising the loom of any one or any combination of embodiments 1-7 of the fourth aspect of the disclosure.

In embodiment 2, the method of embodiment 1 of the fifth aspect of the disclosure further comprises the pre-heat-treated woven material having first and second selvedges; the heat treatment apparatus having selvedge holding structure operable to engage and hold the first and second selvedges at a fixed distance and to thereby maintain a width of the pre-heat-treated woven material during the step of heat treating; and the feeding step including engaging the first and second selvedges with the selvedge holding structure.

In embodiment 3, the method of any one or any combination of embodiments 1-2 of the fifth aspect of the disclosure further comprises the selvedge holding structure of the heat treatment apparatus including tenter pins operable to extend through the selvedge mesh to engage and hold the first and second selvedges; and the feeding step including mounting the first and second selvedges to the tenter pins.

In embodiment 4, the method of any one or any combination of embodiments 1-3 of the firth aspect of the disclosure further comprises the body portion being disposed between the first and second selvedges; each selvedge having an inner selvedge cord and an outer selvedge cord, and the inner and outer selvedge cords extending along the length of the material; the plurality of warp strands including a first set of selvedge warp strands disposed between the inner and outer selvedge cords of the first selvedge, and including a second set of selvedge warp strands disposed between the inner and outer selvedge cords of the second selvedge; each selvedge having a selvedge weave comprising the plurality of weft strands woven with the associated inner and outer selvedge cords and the associated first and second sets of selvedge warp strands; the outer selvedge cord of each selvedge being disposed along a lateral edge of the material and the inner selvedge cord of each selvedge being disposed inwardly from the associated outer selvedge cord; the inner selvedge cord of each selvedge having a diameter equal to or more than 1.5 times greater than the plurality of body warp strands; and a spacing between adjacent selvedge warp strands of the first and second sets of selvedge warp strands being greater than a spacing between the plurality of body warp strands.

DETAILED DESCRIPTION OF THE PREFERRED EMBODIMENTS

Figure 1:
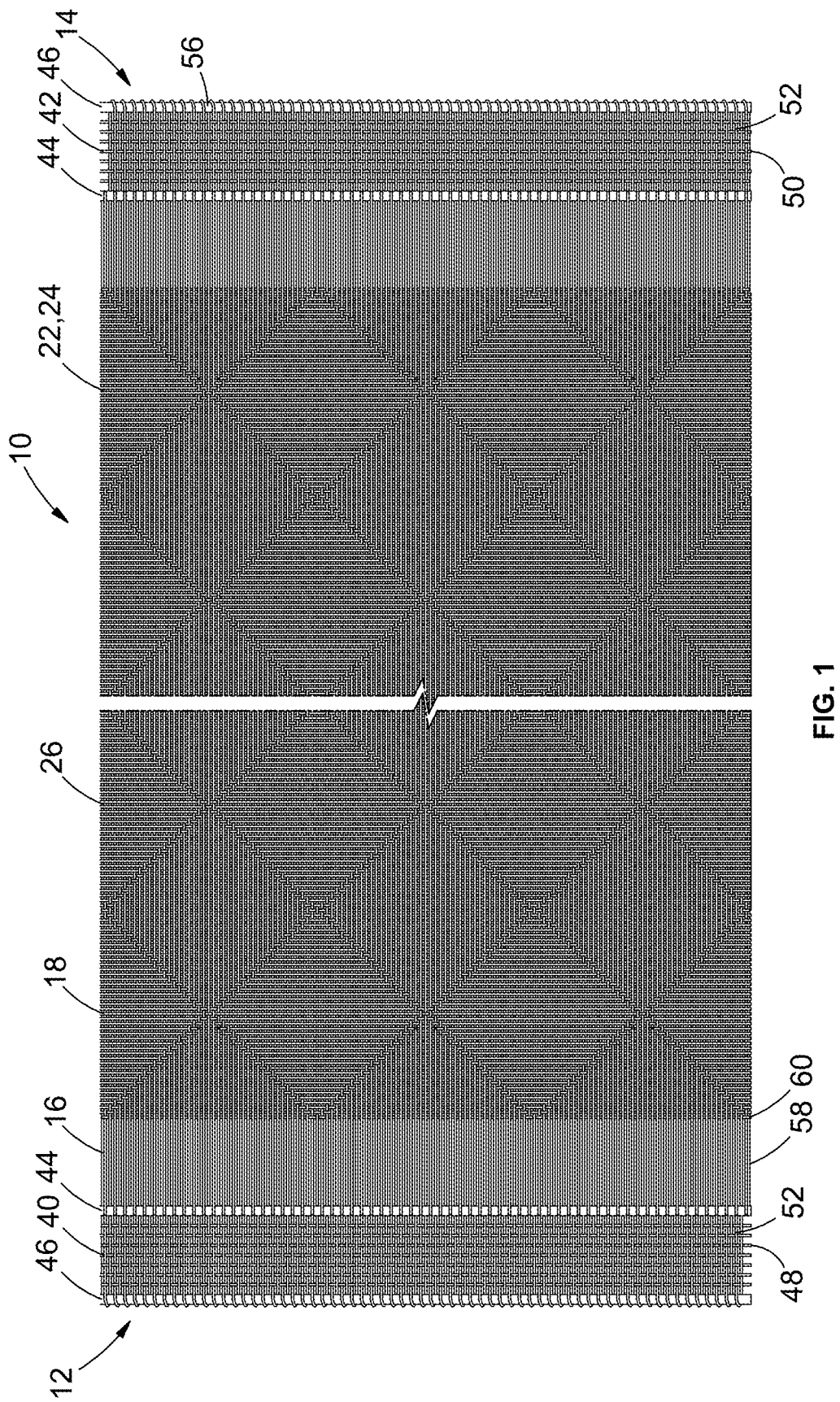
FIG. 1 is a top plan view of a first embodiment of a woven geometric textile material constructed in accordance with the present disclosure.
Figure 2:
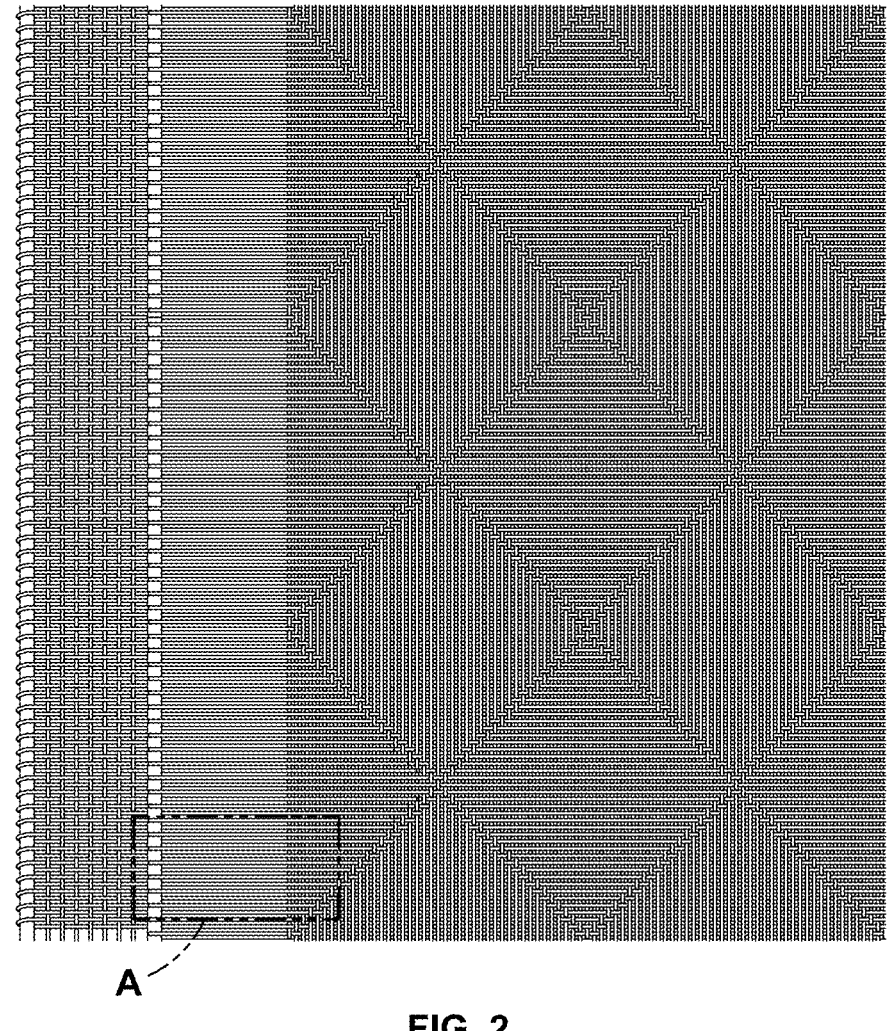
FIG. 2 is a partial plan view of the material of FIG. 1.
Figure 3:
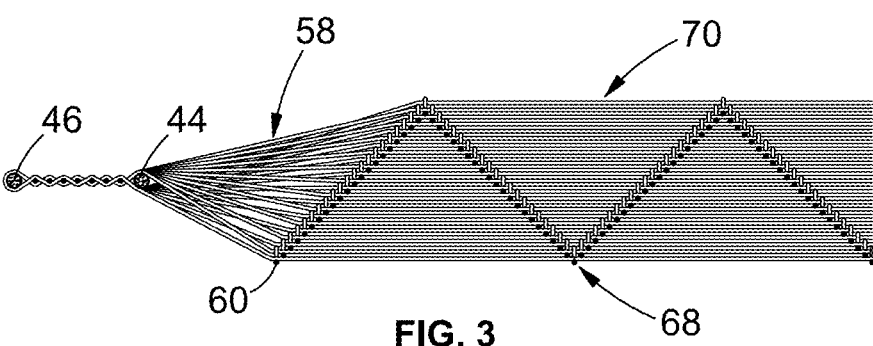
FIG. 3 is a side elevation view of the material of FIG. 1.
Figure 4:
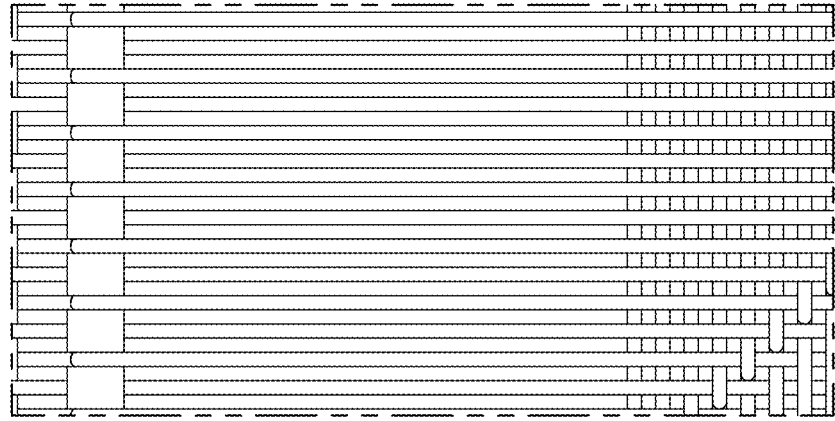
FIG. 4 is a close-up plan view of area A of FIG. 2.
Figure 5:
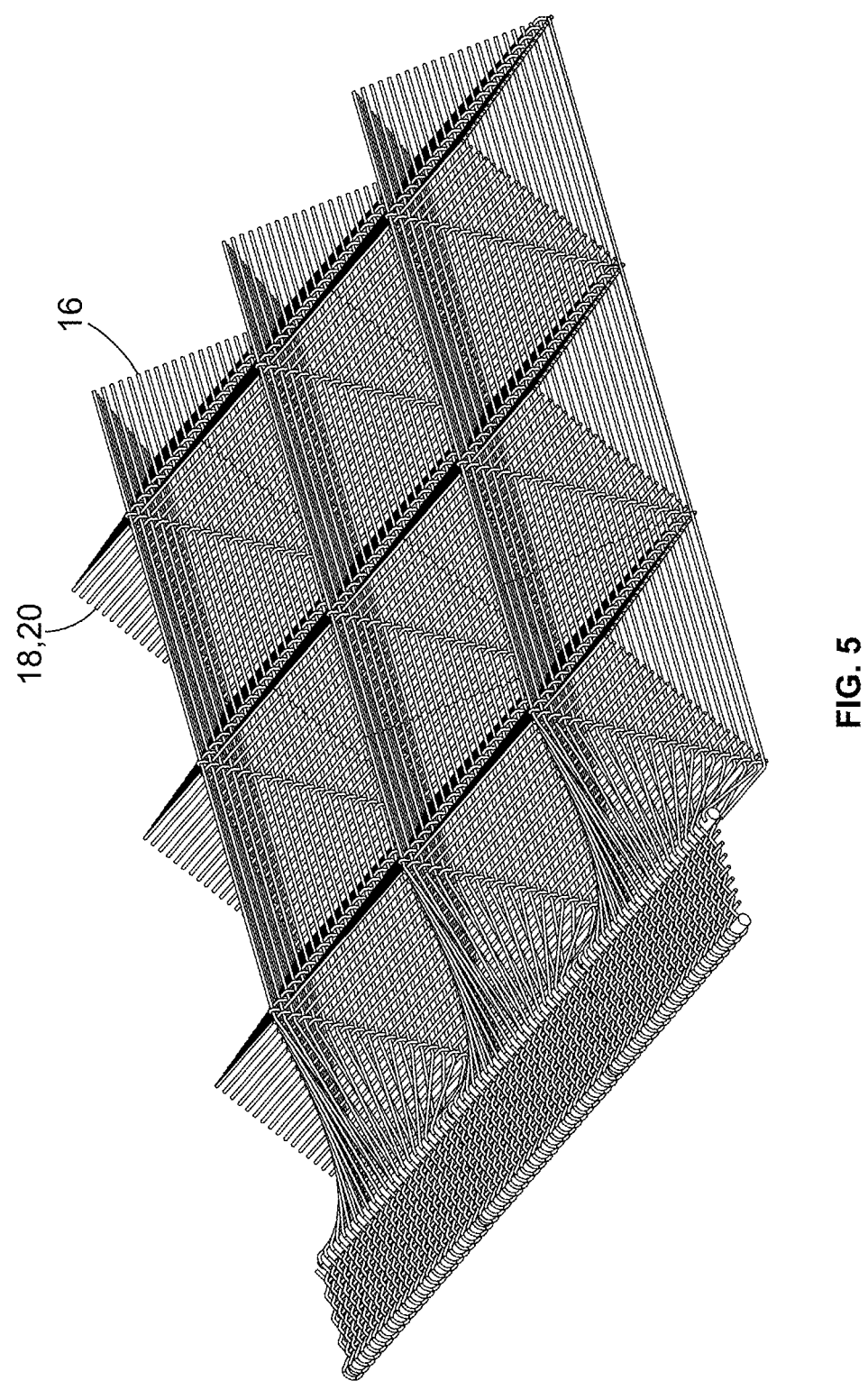
FIG. 5 is a perspective view from the top of the material of FIG. 1.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Referring to FIGS. 1-8, in an embodiment the geometric textile material 10 is woven from weft and warp strands, which can consist of or comprise synthetic material such as thermoplastic monofilament strands, for example comprising or consisting of polypropylene. The textile material has first and second sides 12, 14, a width between the first and second sides and a length parallel to the first and second sides.

The material can be of any suitable width and length. As an example, the material can have a width from the first and second sides of 5-60 ft (or more) (e.g., about 15-180 meters, or more) and can be woven in any practical length.

A plurality of weft strands 16 are woven with a plurality of warp strands 18. The weft strands 16 extend between the first and second sides 12, 14 of the textile material, and the plurality of warp strands extend along the length of the material.

The plurality of warp strands 18 include a set of body warp strands 20 and the textile material includes a body portion 22 disposed between the first and second sides 12, 14. The body portion 22 comprises a body weave 24 which includes the body warp strands 20 woven with the plurality of weft strands 16.

The body weave 24 includes a plurality of repeating weave patterns 26 in a grid having a plurality of rows across the width of the textile material and a plurality of columns along the length of the textile material. Preferably, the repeating weave patterns of the body portion 22 are identical or substantially identical.

Each weave pattern of the plurality of repeating weave patterns 26 preferably includes many warp and weft strands. Preferably, each weave pattern has at least 44 body warp strands and at least 44 weft strands.

As described more fully below, after the weaving process, the textile material 10 is subject to heat treatment which causes the material to take on a 3-dimensional geometric shape which results in a lower solid fraction as compared to the pre-heat-treatment material. After such heat treatment, the repeating weave patterns have a generally equal length sides forming a square pattern and the material has an increased height which can be for example about 4.2 cm.

Due to the large number of warp and weft strands in each weave pattern and the 3-dimensional geometric shape induced by heat treatment, the body portion 22 of the textile material 10 has an ultra-low solid fraction, after the textile material is subject to heat treatment. Preferably, after heat treatment, the body portion 22 of the textile material 10 has a solid fraction of less than 3 percent, preferably less than 2.5 percent and most preferably less than 2 percent.

As used herein, the term "pre-heat-treated woven material" refers to the woven material in a loomstate or greige condition, prior to application of thermal or other finishing treatments. The term "post-heat-treated woven material" refers to the material after thermal treatment(s), whereby the fabric may exhibit altered dimensions, characteristics, or stability.

Due to the low solid fraction of the textile material, it is particularly useful as separation media in certain industrial processes-such in the production of sulfuric acid where mist eliminators are employed to remove fine liquid aerosols from gas streams before those gases are released or further processed. In such processes, the efficiency of the separation media plays a critical role in both process performance and operating cost. A low solid fraction (or, conversely, a high void fraction) of the separation media can reduce the resistance to gas flow, thereby decreasing the pressure drop across the media. This reduction in pressure drop can improve energy efficiency by lowering the power required to move gases through the media, and in large-scale processes these improvements can yield substantial cost savings and enhance production quality.

During heat treatment of the pre-heat-treated woven material, the material of the warp and weft strands (e.g., thermoplastic monofilament strands such as polypropylene) can shrink causing the length of the warp and weft strands to shorten. It is intended for the length of the warp strands 18 to shorten during heat treatment, which results in the increased 3-dimensional shape of the body weave. However, it is desirable to maintain a constant length of the weft strands 16 during heat treatment, which is accomplished by fixing the sides 12, 14 of the material during heat treatment to hold the sides a fixed positions, as discussed more fully below.

The textile material 10 includes improved and robust selvedges 40, 42 which are used during heat treatment of the material including to maintain the length and straight shape of the weft strands during such treatment. Due to the large number of weft and warp strands 16, 18 in each repeating pattern, and the cumulative effect of the plurality of repeating patterns, the weft strands 16 are subject to substantial tension during the heat treatment process. To accommodate such tension, the textile material 10 can include first and second selvedges 40, 42, disposed along first and second lateral edges 54, 56 of the material 10, with the body portion 22 of the material 10 being disposed between the first and second selvedges. Each selvedge has an inner selvedge cord 44 and an outer selvedge cord 46, and the inner and outer selvedge cords 44, 46 extend along the length of the material 10.

The plurality of warp strands 18 include a first set of selvedge warp strands 48 disposed between the inner and outer selvedge cords 44, 46 of the first selvedge 40, and include a second set of selvedge warp strands 50 disposed between the inner and outer selvedge cords 44, 46 of the second selvedge 42.

Each selvedge has a selvedge weave 52 comprising the plurality of weft strands woven with the associated inner and outer selvedge cords 44, 46 and the associated first and second sets of selvedge warp strands 48, 50.

The outer selvedge cord 46 of the first selvedge 40 is disposed along the first lateral edge 54 of the textile material 10 and the outer selvedge cord 46 of the second selvedge 42 is disposed along the second lateral edge 56 of the textile material 10. The inner selvedge cord 44 of each selvedge 40, 42 is disposed laterally inwardly from the associated outer selvedge cord 46. Each selvedge can have a width of about 1.65 inches (0.6496 cm).

The inner selvedge cord 44 of each selvedge 40, 42 preferably has a diameter substantially greater than the diameter of the plurality of body warp strands 20, for example equal to or more than 1.5 times greater. For example, the inner and/or outer selvedge cords 44, 46 can have a diameter of about 0.06 inches (0.02362 cm) and the body warps strands can have a diameter of about 0.0375 inches (0.01476 cm). The relatively large diameter of the inner selvedge cord 44 serves as a transition between the relatively thin selvedge weave 52 and the relatively thick body weave 24 which can improve formation the body weave 24 closest to the selvedges under normal conditions during heat treatment, and can reduce deformation of the body weave 24 under abnormal conditions (such as folding or misfeeding) during heat treatment.

A spacing between adjacent selvedge warp strands of the first and second sets of selvedge warp strands 48, 50 of the first and second selvedges 40, 42 is preferably greater (e.g., about 2 times greater) than a spacing between the plurality of body warp strands 20. For example, the spacing between adjacent selvedge warp strands of the first and second sets of selvedge warp strands 48, 50 of the first and second selvedges 40, 42 can be about 0.119 in (3.02 mm), and the spacing between the plurality of body warp strands 20 can be about 0.061 in (1.56 mm).

The selvedge weave 52 of each selvedge 40, 42 can consist of or include a plain weave and preferably has a thickness which is substantially less than a thickness (e.g., height) of the body weave 24 of the body portion 22. The diameter of the inner selvedge cord 44 of each selvedge 40, 42 is preferably between the thickness of the selvedge weave 52 and the thickness of the body weave 24 of the body portion 22.

Each inner selvedge cord 44 preferably has a rough exterior surface relative to the weft strands such as flocking or another suitable rough surface. The rough surface of each inner selvedge cord 44 serves to grip the weft strands 16 passing thereover, which is desirable to maintain or achieve proper material shape during heat treatment.

The inner and outer selvedge cords 44, 46 preferably have a color which contrasts with a color of the weft and warp strands 16, 18 and the selvedge weave formed thereby. For example, the inner and outer selvedge cords 44, 46 can have white or other substantially light color and the weft and warp strands 16, 18 can have a black or other substantially dark color, or vice versa. The contrast in color can provide a visual guide when mounting the selvedges in heat treatment apparatus.

The textile material 10 preferably includes a substantial gap 58 between the inner selvedge cord 44 of each selvedge 40, 42 and the body weave 24 (and more particularly, between the inner selvedge cord 44 of each selvedge 40, 42 and a body warp strand 60 closest to the associated selvedge). For example, the gap 58 can be about 0.2 inches (0.07874 cm), or more. The gap formed between the inner selvedge cord 44 and the body weave 24 serves to reduce the undesirable effect of abnormal conditions during the heat treatment process (or preparation therefor), such as a mis-alignment or mis-mounting (e.g., folding or uneven feeding) of the selvedges during feeding the textile material 10 into the heat treatment apparatus for the heat treatment process.

The usable portion of the textile material 10 is the body portion 22. During finishing of the material, and after the heat treatment process, the selvedge portions and any gap portion between the selvedges and the body portion 22 are typically removed. Additionally, any malformed sections of the body portion 22 can be removed. The discarded portions are preferably recycled as strands for making additional textile material, or other suitable uses. The finished body portion 22 is typically divided into desired sizes for sale or use.

The textile material 10 is an improvement of the geometric textile (geotextile) material disclosed in U.S. Pat. Nos. 4,022,596 and 4,929,398 granted to George C. Pedersen, Jr. (the "Pedersen patents"), the disclosures of which are hereby incorporated by reference in their entireties. Such geotextile material is a highly ordered geometric engineered textile (or, in other words, a woven geometric mesh structure material).

The Pedersen patents disclose a particular geotextile material and certain uses of such material. However, the Pedersen patents do not disclosure or suggest the structure of the textile material 10 disclosed herein including a textile material where each weave pattern of the plurality of repeating weave patterns includes at least 44 body warp strands and at least 44 weft strands and where the body portion of the textile material has an ultra-low solid fraction of less than 3%, post-heat treatment. While the material disclosed in the Pedersen patents was revolutionary for its time, the ability and technology to make the textile material disclosed herein was not known or available. Recently, the present inventor(s) developed and discovered the apparatus and methods required to make the present textile material.

Figure 6:
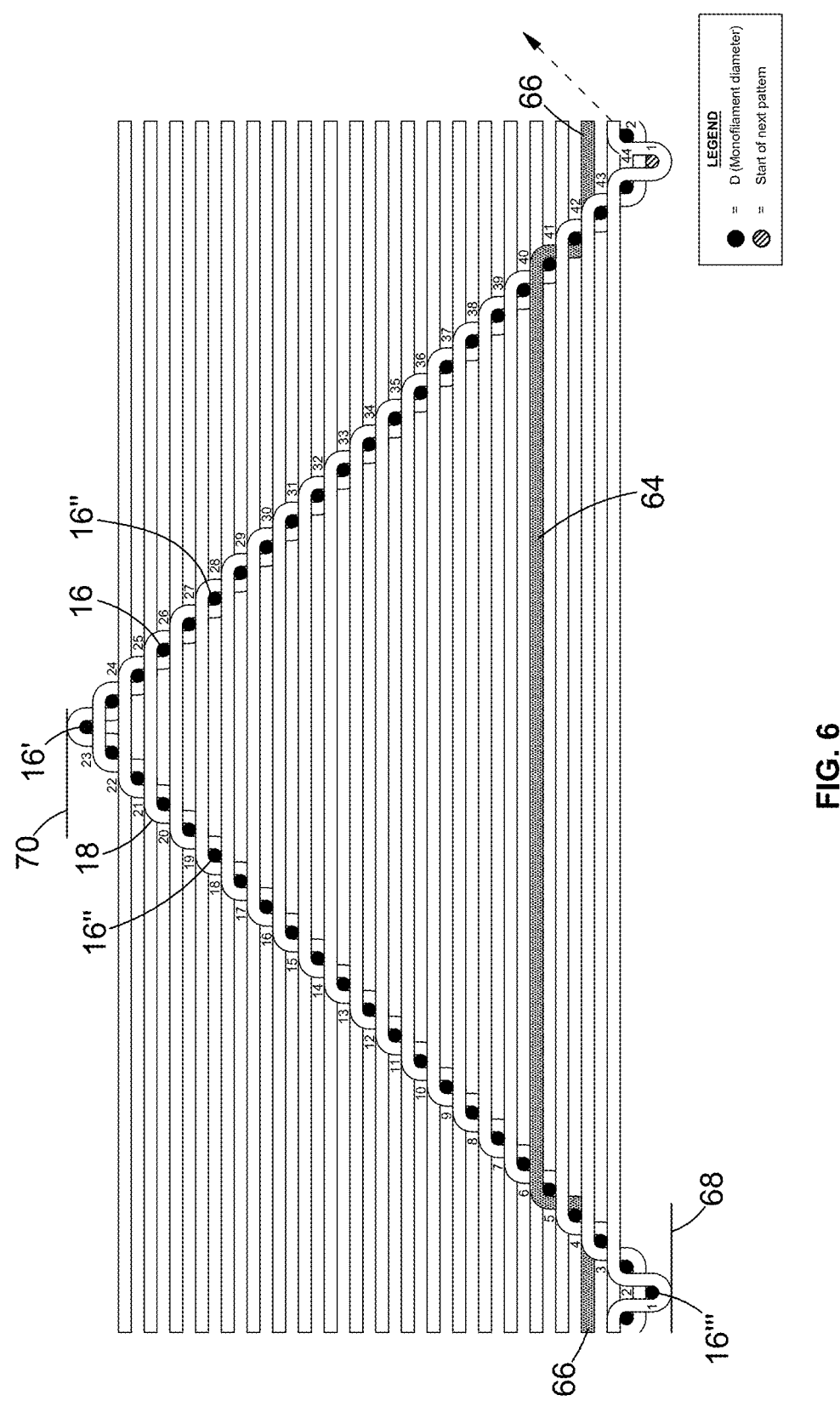
FIG. 6 is a cross-section elevation view of the material of FIG. 1.
Figure 7:
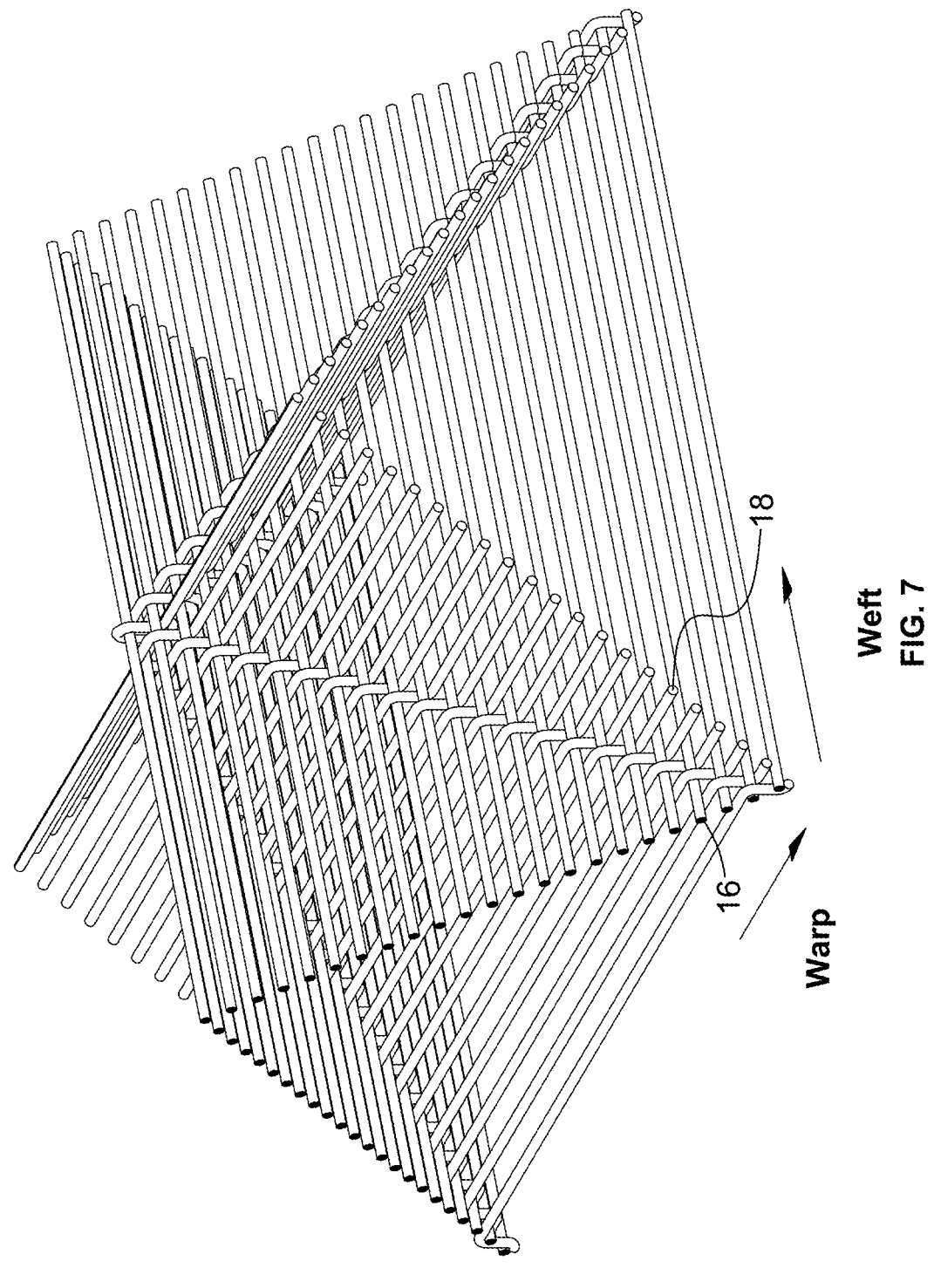
FIG. 7 is a perspective view of the material of FIG. 1.
Figure 8:
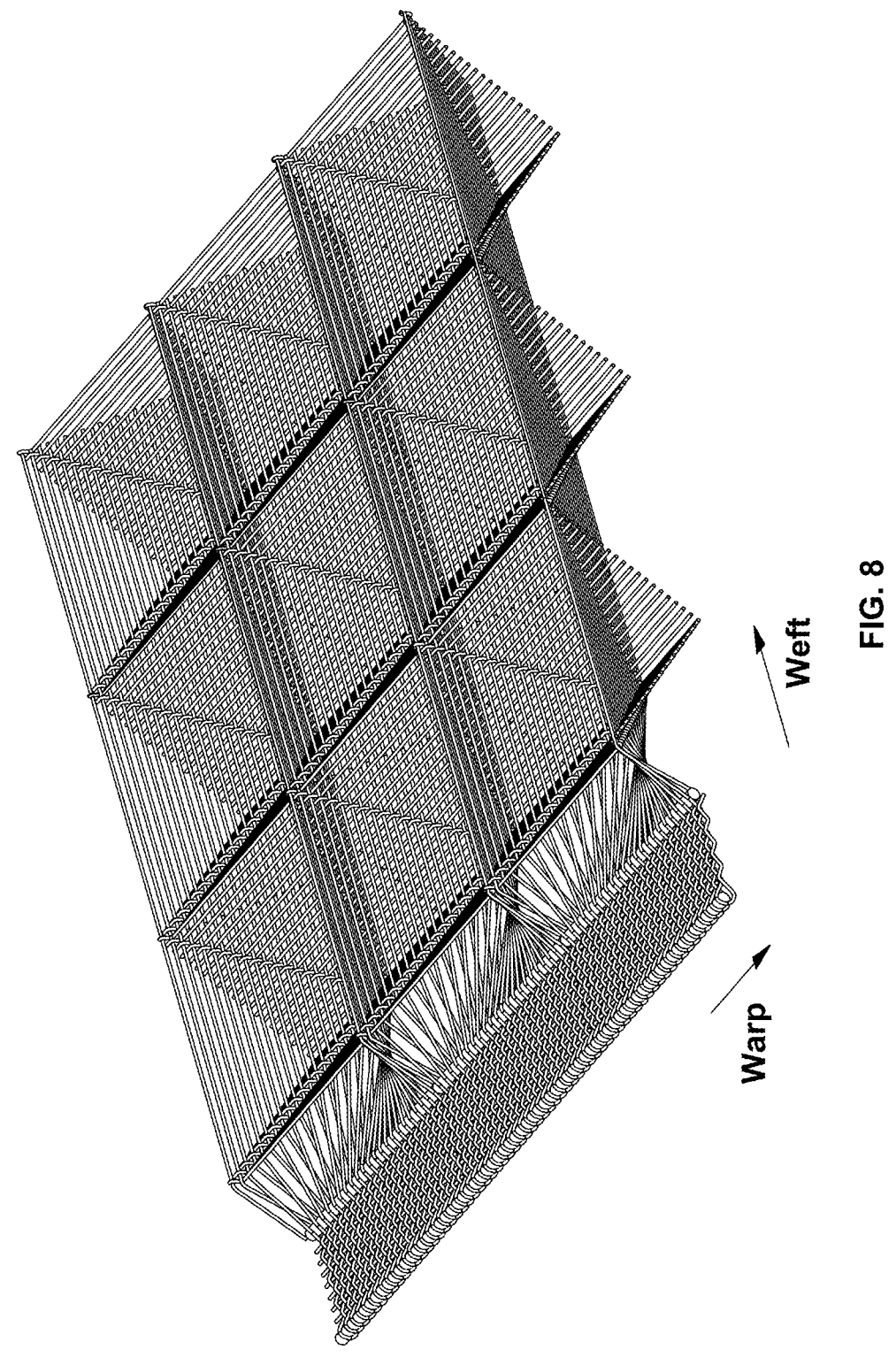
FIG. 8 is a perspective view from the top of the material of FIG. 1.
Figure 9:
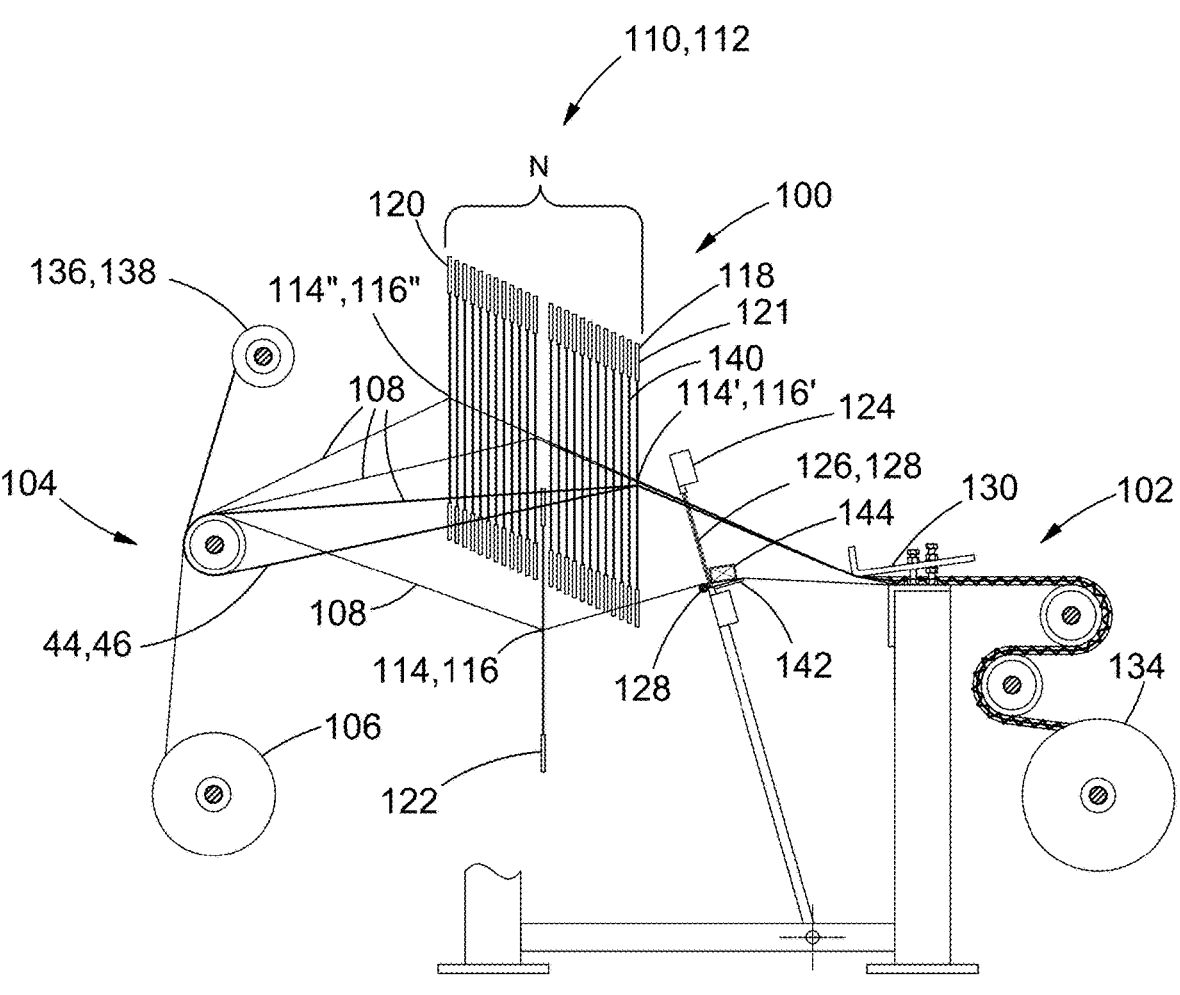
FIG. 9 is a schematic of a first embodiment of a loom apparatus constructed in accordance with the present invention, showing the apparatus in an open weaving position.
Figure 10:
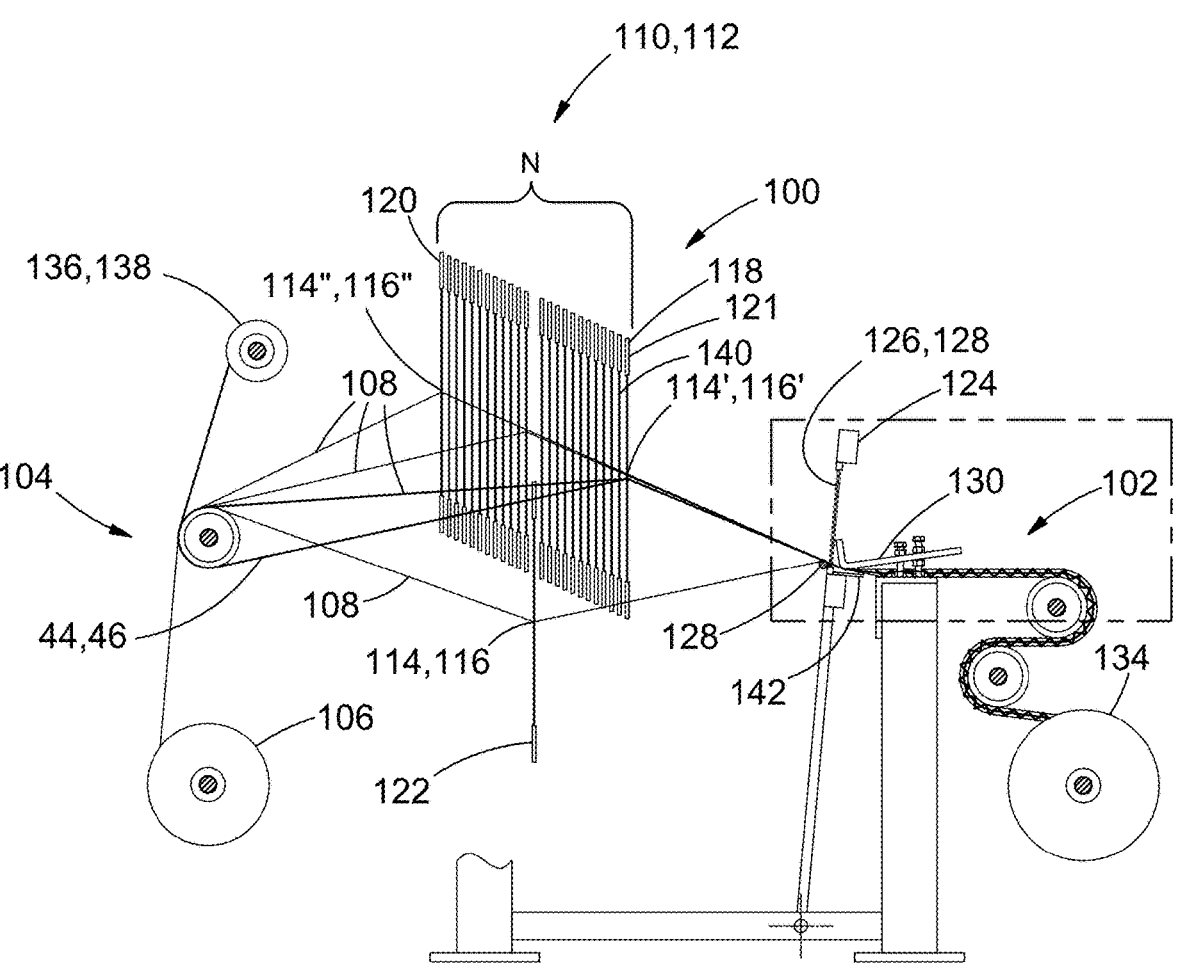
FIG. 10 is a schematic of the apparatus of FIG. 9, showing the apparatus in a closed weaving position.
Figure 11:
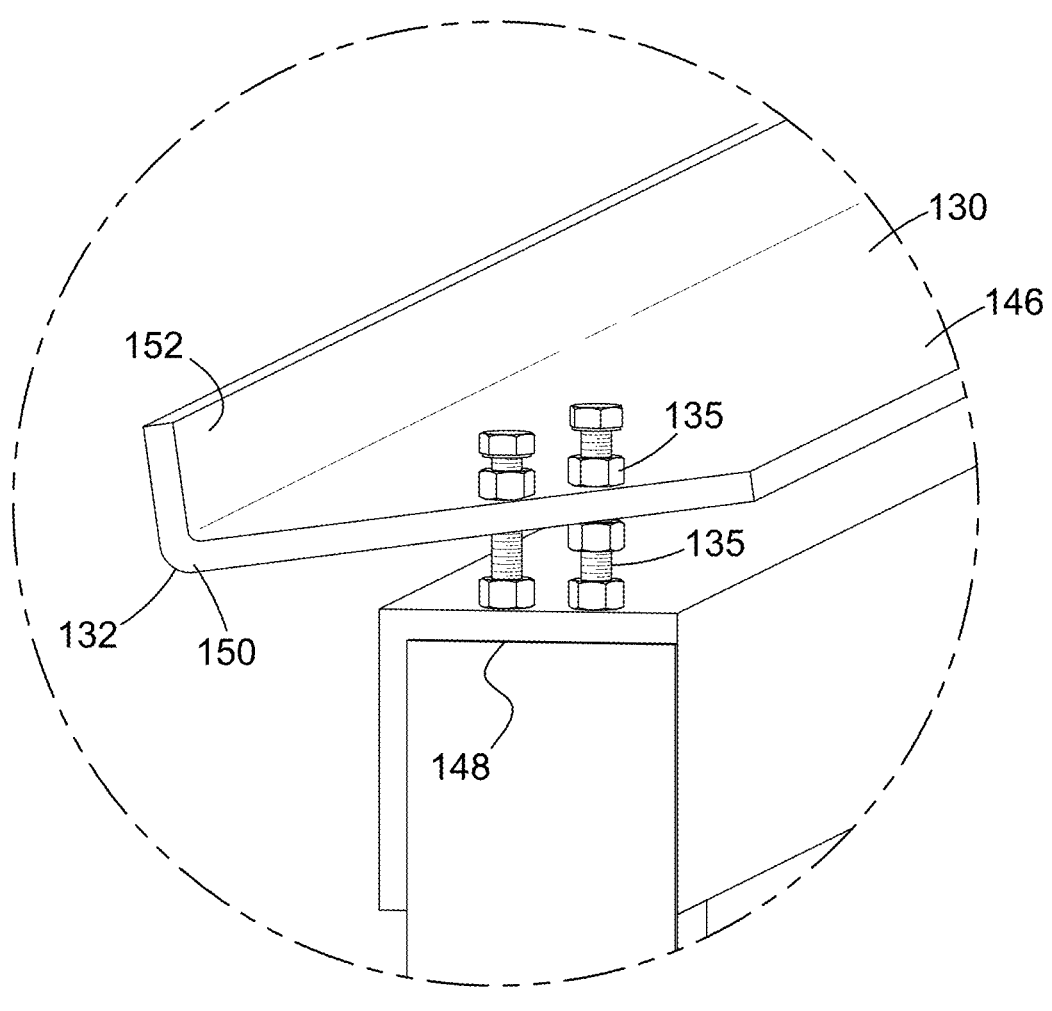
FIG. 11 is a close-up of the apparatus of FIG. 9, showing the hold-down bar.
Figure 12:
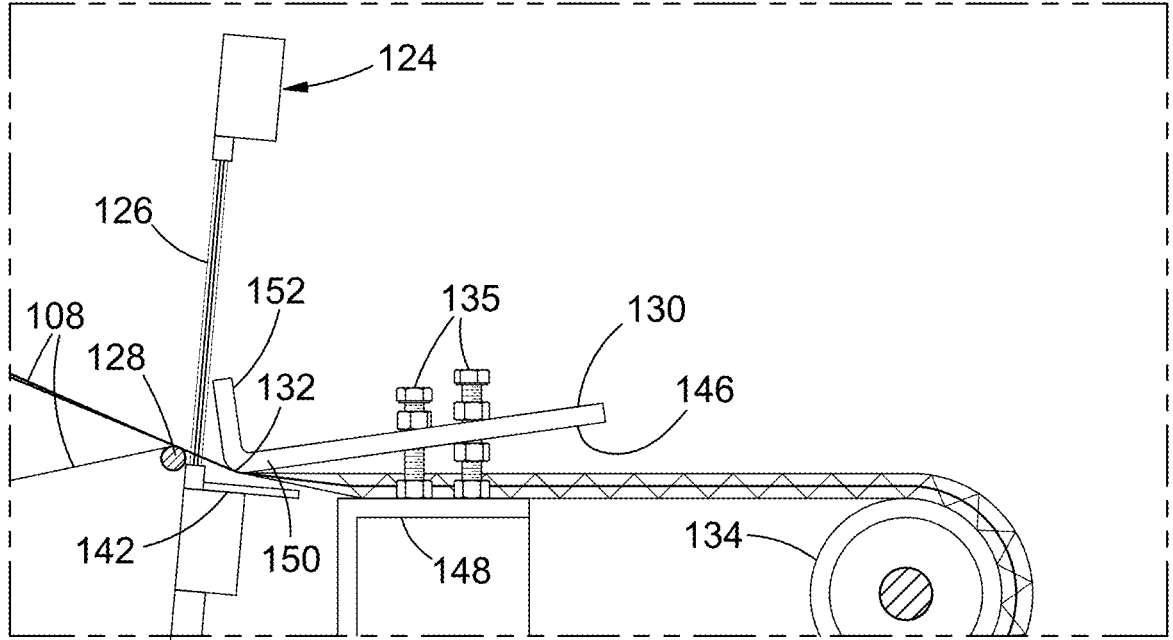
FIG. 12 is a close-up of the apparatus of FIG. 9, showing the reed and the hold-down bar, with the reed in the closed weaving position.

Referring to FIGS. 6 & 7, each pattern of the repeating patterns 26 of the body portion 22 of the textile material 10 disclosed herein includes a first set of strands—weft strands 16—extending in parallel fashion in one predetermined direction and substantially straight throughout their length (when the material is in planar form).

After heat treatment, the weft strands 16 are arranged in a repeating pattern, preferably of a saw-tooth cross-sectional configuration (for example where the cross-sections form a two-dimensional substantial triangular wave pattern).

A second set of strands—warp strands 18 (and in particular, body warp strands 20)—extends perpendicular to the weft strands 16 and is similarly arranged to have a generally sawtooth cross-sectional configuration. Where each of the warp strands 18 intersect with the weft strands 16, the warp strand 18 passes between two of the weft strands 16 and then is redirected at a sharp angle (e.g., 90 or 180 degrees) to pass around the next adjacent weft strand 16. The warp strand 18 is then redirected parallel to its original direction, which is parallel to the "plane" of the textile material structure generally, until the warp strand 18 again intersects with and passes between two of the weft strands 16. Upon passing between such two weft strands 16, the warp strand 18 is redirected to pass around the next adjacent weft strand 16, after which the warp strand 18 is again directed in its original plane until it intersects with a subsequent group of weft strands 16 from the first set.

In the idealized, post-heat treatment construction shown in FIGS. 6 and 7, the weft strands 16 of the first set are substantially straight throughout their length. The warp strands 18 of the second set, extending perpendicular thereto, are arranged in substantially straight segments, which are alternately offset.

Thus, with reference to FIGS. 6 and 7, a particular warp strand 18 of the second set typically will have a first section 62, extending straight in the "plane" of the material. The first section 62 joins with a second section 64 which, in the illustrated construction, is offset three strand thicknesses upward, but extends parallel to it. The second section 64 is in turn connected to a third section 66, which is generally coaxial with the first section 62. A further section (not shown) is substantially coaxial with the second section 64 and this pattern repeats throughout the length of the strand.

The textile material illustrated can be constructed utilizing thermoplastic monofilament strands. After the initial construction, a treatment procedure can be carried out (such as heat treatment), during which the weft strands 16 are held under sufficient tension to maintain their relative straightness.

Although textile material 10 illustrated has a waffle-like structure, with deep void-forming pockets, the material is substantially non-nestable with layers of like material. If adjacent layers of the material come into contact, the strands at the surface of one layer of material will contact strands of an adjacent contacting layer. This effectively prevents nesting regardless of how one layer of material registers with respect to an adjacent layer.

In each pattern of the repeating patterns 26 of the body portion 22 of the textile material 10, each strand of the first set—the weft strands 16—is substantially straight and parallel to every other strand in the first set, and each weft strand 16 is spaced from every other weft strand in the set both vertically and horizontally. In each pattern, the second set of strands of material—the warp strands 18—are interleaved with the weft strands 16, and each of the warp strands 18 is substantially parallel to every other warp strand in the set. The weft strands 16 are perpendicular to the warp strands 18. The lengths of each of the warp strand extend in interleaved fashion through the weft strands a geometric orientation to fit vertical and horizontal offset spacing of each strand in the first set. Each of the warp strands of the second set include a plurality of substantially straight-line portions connected at right angles to provide the geometric orientation. The geometric orientation of the second set of strands and the offset spacing of the first set of strands gives the geometric mesh structure a thickness in cross section substantially greater than a diameter of the strands of the first and second sets of strands.

Each pattern of the repeating weave patterns 26 of the body portion 22 shares a body warp strand 18 with a first adjoining repeating weave pattern, such as a pattern laterally adjacent thereto (i.e., in the lateral or width direction of the material, parallel to the weft strands), and shares a weft strand with a second adjoining repeating weave pattern, such as a pattern longitudinally adjacent thereto (i.e., in the longitudinal or length direction of the material parallel to the warp strands). For example, in the embodiment shown in FIG. 6, the repeating pattern involves 44 weft strands and 45 warp strands.

The body portion 22 can be a geometric mesh structure comprising a woven material of a waffle-weave construction comprising repeating groups of first and second sets of strands with the first set of strands comprising generally parallel strands which extend in substantially straight fashion in one predetermined direction. Each repeating group of strands of the first set being arranged in a generally saw-tooth cross sectional configuration whereby a thickness of the woven material is substantially equal to a height of the saw-tooth cross sectional configuration. Each repeating group of strands of the second set being arranged in a generally saw-tooth cross sectional configuration intersecting at right angles with the strands of the first set.

Alternatively, or additionally, the woven geometric textile material can comprise a geometric mesh structure comprising a woven material having a first set of generally parallel strands extending in substantially straight fashion in one predetermined direction and a second set of strands extending at right angles to the predetermined direction. The strands of said first set being arranged in a repeating two-dimensional cross sectional geometric pattern in which strands at the extremes of the pattern define a fabric thickness which is a multiple of at least about 44 of a diameter of a strand. The strands of the second set also being arranged in a repeating two-dimensional cross sectional geometric pattern intersecting with the strands of the first set; the strands of the second set, at the extremes of the geometric pattern thereof, additionally defining a material thickness which is a multiple of at least about 44 of a diameter of a strand. The strands of the second set extending in substantially straight manner in regions between contact with strands of the first set, and the intersecting strands of the first and second sets forming a substantially non-nestable construction.

Alternatively, or additionally, the body portion can comprise a geometric mesh structure comprising a first set of strands of material and a second set of strands of material. Each strand of the first set being substantially straight and parallel to every other strand in the first set. Each strand of the first set being spaced from every other strand in the first set both vertically and horizontally. The second set of strands of material being interleaved with the first set, each of the strands of the second set being substantially parallel to every other strand in the second set; the strands of the first set being perpendicular to the strands of the second set. The lengths of each strand of the second set extending in interleaved fashion through the strands of the first set in a geometric orientation to fit vertical and horizontal offset spacing of each strand in the first set. Each of the strands of the second set including a plurality of substantially straight-line portions connected at angles to provide the geometric orientation, and the geometric orientation of the second set and the offset spacing of the first set giving the geometric mesh structure a thickness in cross section substantially greater than a diameter of the strands of the first and second sets of strands.

The height of the textile material (which can also be considered a thickness of the material) can be defined by a perpendicular distance between a bottom plane 68 of the body portion 22 of the material 10 and a top plane 70 of the material, post heat treatment.

The relevant solid fraction of the textile material 10 is the solid fraction of the body portion 22, as that is the usable portion of the material. One way to calculate the solid fraction of the material is by determining the density of a section of the body portion 22 the material 10 and dividing that amount by the density of the material comprising the strands that form body portion 22, or:

Solid Fraction=Density of Sample Section/Density of Strands.

The density of the sample section of the body portion 22 can be calculated by determining the weight and volume of the section, where the density of the sample section is the weight divided by the volume, or:

Density of Sample Section=Weight/Volume of Sample Section

Figure 13:
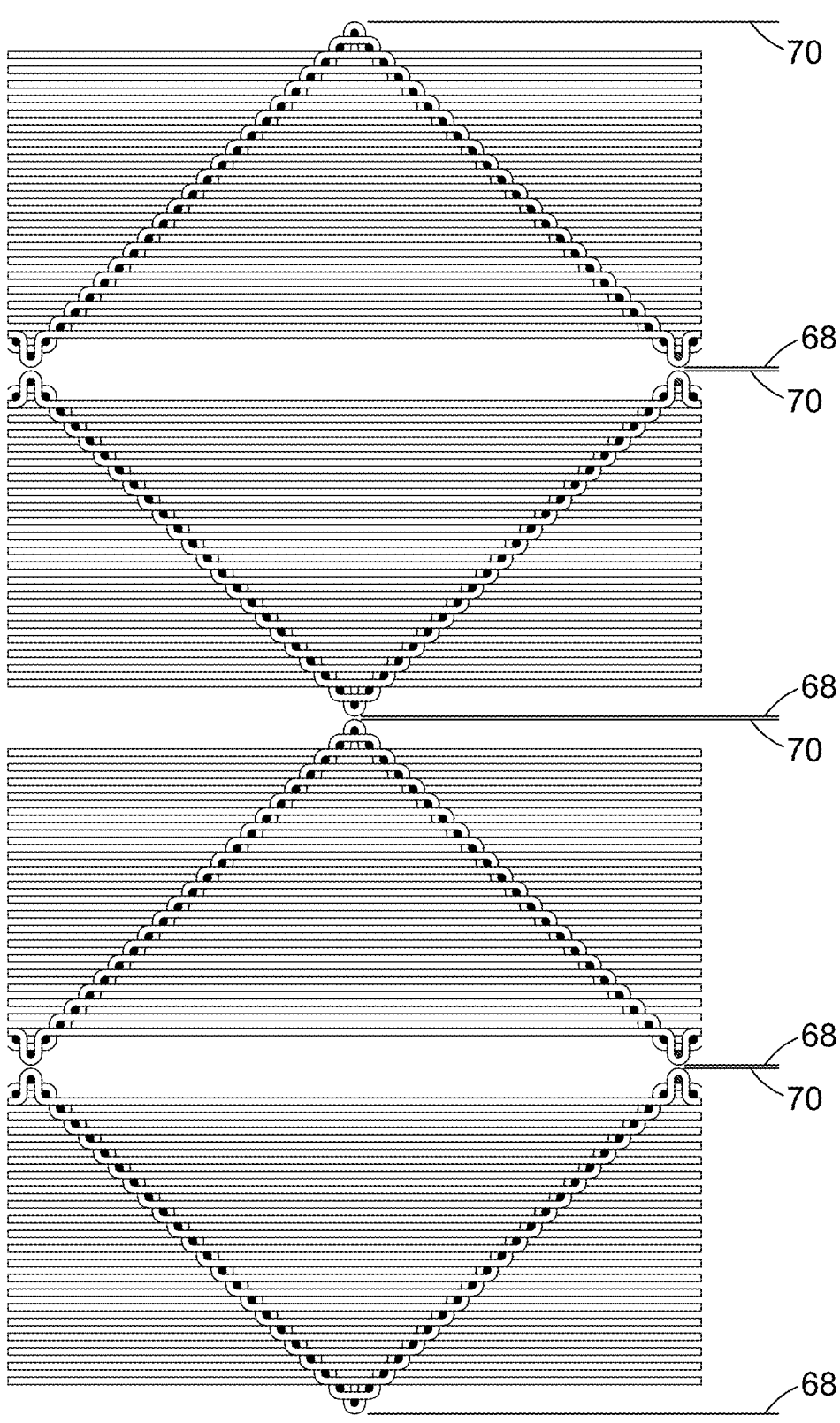
FIG. 13 is a schematic of a stack of multiple layers of the material of FIG. 1.

Referring to FIG. 13, the solid fraction can be calculated using a stack of multiple layers of material which reduces the effects of potential minor dimensional variance of the material and the effect of potential measurement imprecision of the thickness of the material. Such multi-layer configuration also corresponds to the most common usage of such materials.

For example, the solid fraction can be calculated using at least four (4) layers of the material of equal and predetermined length and width which are stacked in an abutting face-to-face configuration such that a measurement of a thickness of the stack is an aggregate thickness of the stack of the individual layers. Since the material is non-nesting when stacked in this manner, this method provides an accurate aggregate thickness of a stack of layers of the material.

For example, the layers of material can consist of sections of the body portion 22, and the layers can be stacked such that the bottom plane 68 of an upper layer of material abuts a top plane 70 of the next lower layer of material. The aggregate thickness of the stack of materials is preferably measured from the top most plane of the top most layer of material in the stack to a bottom most plane the bottom most layer of material in the stack.

The aggregate volume of the stack can then be determined using the width, length and aggregate thickness. The aggregate weight of the stack can be measured. Then the density of the stack can be determined using the aggregate volume and aggregate weight. Thereafter, the solid fraction of the stack of material can be determined by dividing the density of the stack by the density of the strands, as set forth above.

Set forth in Table 1 below are solid fraction calculations for woven material constructed in accordance with the invention, where each sample section had an area of 1 ft×1 ft (length×width) which corresponds to 1 square foot or approximately 929 square centimeters, and the strands were formed of polypropylene having a density of 0.90 gm/cubic cm.

Two (2) separate stacks of four (4) layers of material were each measured four (4) times resulting in eight (8) measurements. The measurements indicate that the material has a low actual solid fraction of less than 3% and specifically less than 2.70%, 2.60% and 2.5%.

TABLE 1

| No. | Code | Area (cm²) | Thick (cm) | Volume (cm³) | Weight (g) | Sample Density (g/cm³) | Strand Density (g/cm³) | Solid Fraction (%) |
|---|---|---|---|---|---|---|---|---|
| 1 | 37/98 | 929 | 16.10 | 14960.29 | 357.9545 | 0.023926984 | 0.90 | 2.66% |
| 2 | 37/98 | 929 | 15.98 | 14842.3 | 357.9545 | 0.024117183 | 0.90 | 2.68% |
| 3 | 37/98 | 929 | 16.05 | 14913.09 | 357.9545 | 0.024002703 | 0.90 | 2.67% |
| 4 | 37/98 | 929 | 16.61 | 15432.22 | 357.9545 | 0.023195272 | 0.90 | 2.58% |
| 5 | 37/98 | 929 | 16.36 | 15196.25 | 357.9545 | 0.023555447 | 0.90 | 2.62% |
| 6 | 37/98 | 929 | 16.87 | 15668.19 | 357.9545 | 0.022845946 | 0.90 | 2.54% |
| 7 | 37/98 | 929 | 16.26 | 15101.87 | 357.9545 | 0.023702669 | 0.90 | 2.63% |
| 8 | 37/98 | 929 | 17.48 | 16234.51 | 357.9545 | 0.022048994 | 0.90 | 2.45% |

Set forth in Table 2 below are actual solid fraction calculations for prior woven material constructed in accordance to prior known apparatus and methods, where the woven materials have a plurality of repeating patterns having 19 warps and 20 wefts per pattern.

Each sample section had an area of 1 ft×1 ft (length× width) which corresponds to 1 square foot or approximately 929 square centimeters, and the strands were formed of polypropylene having a density of 0.90 gm/cubic cm.

The material samples were measured in a stack of four (4) layers as described above with respect to the samples in Table 1. Two (2) separate stacks of four (4) layers of material were each measured four (4) times resulting in eight (8) measurements. The measurements indicate that the material has a relatively high actual solid fraction of greater than 3% and specifically greater than 3.10%.

TABLE 2

| No. | Code | Area (cm²) | Thick (cm) | Volume (cm³) | Weight (g) | Sample Density (g/cm³) | Strand Density (g/cm³) | Solid Fraction (%) |
|---|---|---|---|---|---|---|---|---|
| 1 | 37/97 | 929 | 11.91 | 11066.84 | 335.2273 | 0.030291156 | 0.90 | 3.37% |
| 2 | 37/97 | 929 | 12.17 | 11302.8 | 335.2273 | 0.029658773 | 0.90 | 3.30% |
| 3 | 37/97 | 929 | 12.04 | 11184.82 | 335.2273 | 0.029971629 | 0.90 | 3.33% |
| 4 | 37/97 | 929 | 10.69 | 9934.197 | 335.2273 | 0.033744779 | 0.90 | 3.75% |
| 5 | 37/97 | 929 | 11.79 | 10948.85 | 338.0682 | 0.03087704 | 0.90 | 3.43% |
| 6 | 37/97 | 929 | 12.45 | 11562.37 | 338.0682 | 0.029238666 | 0.90 | 3.25% |
| 7 | 37/97 | 929 | 11.48 | 10665.69 | 338.0682 | 0.031696784 | 0.90 | 3.52% |
| 8 | 37/97 | 929 | 12.80 | 11892.72 | 338.0682 | 0.028426481 | 0.90 | 3.16% |

Set forth in Table 3 below are actual solid fraction calculations for prior woven material constructed in accordance to prior known apparatus and methods, where the woven materials have a plurality of repeating patterns having 9 warps and 10 wefts per pattern.

Each sample section had an area of 1 ft×1 ft (length× width) which corresponds to 1 square foot or approximately 929 square centimeters, and the strands were formed of polypropylene having a density of 0.90 gm/cubic cm.

The material samples were measured in a stack of four (4) layers as described above with respect to the samples in Table 1. One (1) stack of four (4) layers of material was measured four (4) times resulting in four (4) measurements. The measurements indicate that the material has a relatively high actual solid fraction of greater than 7%.

TABLE 3

| No. | Code | Area (cm²) | Thick (cm) | Volume (cm³) | Weight (g) | Sample Density (g/cm³) | Strand Density (g/cm³) | Solid Fraction (%) |
|---|---|---|---|---|---|---|---|---|
| 1 | 37/94 | 929 | 5.66 | 5262.057 | 335.2273 | 0.063706511 | 0.90 | 7.08% |
| 2 | 37/94 | 929 | 5.41 | 5026.09 | 335.2273 | 0.066697427 | 0.90 | 7.41% |
| 3 | 37/94 | 929 | 5.33 | 4955.3 | 335.2273 | 0.067650248 | 0.90 | 7.52% |
| 4 | 37/94 | 929 | 5.05 | 4695.737 | 335.2273 | 0.071389709 | 0.90 | 7.93% |

The woven geometric textile material constructed in accordance with the invention has a very high capacity to process gas streams having a gas phase and an entrained liquid phase to capture and remove the liquid phase. In a mist eliminator, for example, the flow capacity refers to the maximum gas flow velocity (e.g., ft/sec or m/sec) that can be processed through the separation media while maintaining efficient separation and stable operation.

As described herein, the flooding velocity of a separator material is generally recognized as the condition where the material becomes over-loaded with liquid, and the pressure drop across the material increases rapidly and disproportionately (often exponentially) with increasing velocity.

In practice, the gas flow velocity is typically limited to a fraction of the flooding velocity—commonly 60-80% of the flooding velocity—to ensure stable performance and effective drainage.

The void fraction ($\varepsilon$) of a mist eliminator medium affects flooding velocity. A small increase in void fraction ($\varepsilon$) can yield a significant increase in flooding velocity while maintaining separation performance.

Figure 14:
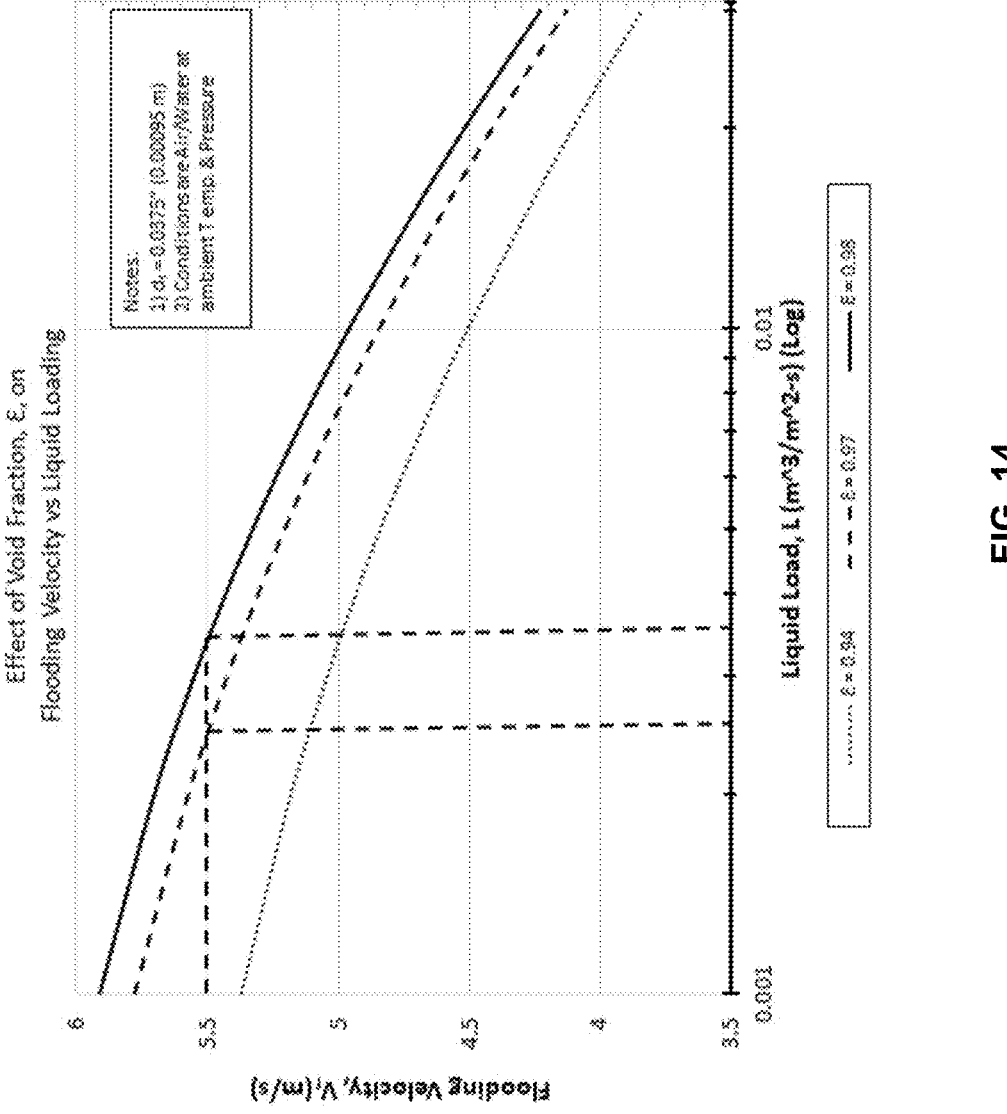
FIG. 14 is a graph of flooding velocity profiles of materials.

Referring to FIG. 14, increasing the void fraction of separation media, for example in a mist eliminator, can significantly raise the flooding velocity at which the device can operate. Because flooding velocity often constrains the design of separation equipment, improving flooding velocity (i.e., increasing flooding velocity) enables users to reduce vessel size and overall capital cost.

FIG. 14 provides flooding velocity profile lines for separation media according to a well-recognized formula (Formula 1, below), specifically for separation media having several solid fractions of 6%, 3% and 2% corresponding to void fractions ($\varepsilon$) of 0.94, 0.97 and 0.98, where the diameter of the fiber is 0.0375 inches (0.00095 meters), and where the process gas is an air-water mixture at ambient temperature and pressure (such that the density of the gas and liquid phases are about 1.204 kg/m3 and 1000 kg/m3, respectively), at least in a liquid load (L) range of 0.001 to 0.03 m3/m2-s (cubic meters of liquid per square meter of cross-sectional area of separation media per second, which is a standard way to express how much liquid is present in a gas stream relative to the cross-sectional area of the separation media of a separation media).

Formula 1:

$$V_f = 0.144\varepsilon^{2.3}d_f^{-0.071}\left(1 + 3.1L^{0.5}\right)^{-1}\sqrt{\frac{\rho_L - \rho_V}{\rho_V}}$$

Where:

$V_f$ is the flooding velocity;

$\varepsilon$ is the void fraction of the material;

$d_f$ is the diameter of the strands (e.g., fiber) comprising the material;

L is the liquid loading of the gas stream;

$\rho L$ is the density of the liquid phase (i.e., the entrained liquid droplets) present in the gas stream; and $\rho V$ is the density of the gas phase forming the continuous carrier stream.

FIG. 14 illustrates that even a 1% decrease in solid fraction (e.g., from 3% to 2%) which corresponds to an increase in void fraction ($\varepsilon$)—e.g., from $\varepsilon$=0.97 to $\varepsilon$=0.98—can significantly increase the liquid loading capacity of a separator material. For example, as indicated in FIG. 14, at a given flooding velocity (Vf) of 5.5 m/s, where a separation media has fibers with a diameter of 0.0375 inches (0.00095 meters) and a void fraction of 0.97 and where the process gas is an air-water mixture at ambient temperature and pressure (such that the density of the gas and liquid phases are about 1.204 kg/m3 and 1000 kg/m3, respectively), the separation media has a liquid load capacity of about 0.0024 m3/m2-s (Point A) whereas such a separation media having a void fraction of 0.98 (i.e., 1% greater) has a liquid load capacity of about 0.0034 m3/m2-s (Point B), which is about 40% greater. This enhancement in liquid load processing capacity can translate into substantial operational and economic benefits. For example, certain process equipment such as sulfuric acid concentrators (evaporators) are limited in their production capacity due to the liquid handling capacity of the mist eliminator. By increasing that capacity by 40%, the producers can significantly increase chemical productivity, reduce production costs per ton, improve plant flexibility, and improve environmental impacts.

The woven geotextile constructed in accordance with the invention, has a high void fraction and a high percentage of fibers oriented perpendicular to gas flow, which achieves high local voidage while retaining transverse collision surfaces, extending the operational range before flooding.

The woven geometric textile material of the invention preferably has a flooding velocity at or above a flooding velocity profile defined by Formula 1 where the solid fraction associated with the flooding velocity profile is at or less than 3%, 2.7%, 2.6% or 2.5% which corresponds to a void fraction ($\varepsilon$) associated with the flooding velocity profile at or greater than 97% or 97.3% or 97.4% or 97.5% (i.e., e at or greater than 0.97, 0.973, 0.974, or 0.975), at least in a liquid load (L) range of 0.001 to 0.03 m3/m2-s. For example, the woven geometric textile material of the invention having a fiber diameter is 0.0375 inches (0.00095 meters) preferably has a flooding velocity at or above a flooding velocity profile defined by Formula 1, where the void fraction ($\varepsilon$) associated with the flooding velocity profile is at or greater than 97% (i.e., $\varepsilon$ at or greater than 0.97) and the gas stream is an air-water mixture at ambient temperature and pressure such that the density of the gas and liquid phases are about 1.204 kg/m3 and 1000 kg/m3, respectively, at least in a liquid load (L) range of 0.001 to 0.03 m3/m2-s.

Figure 15:
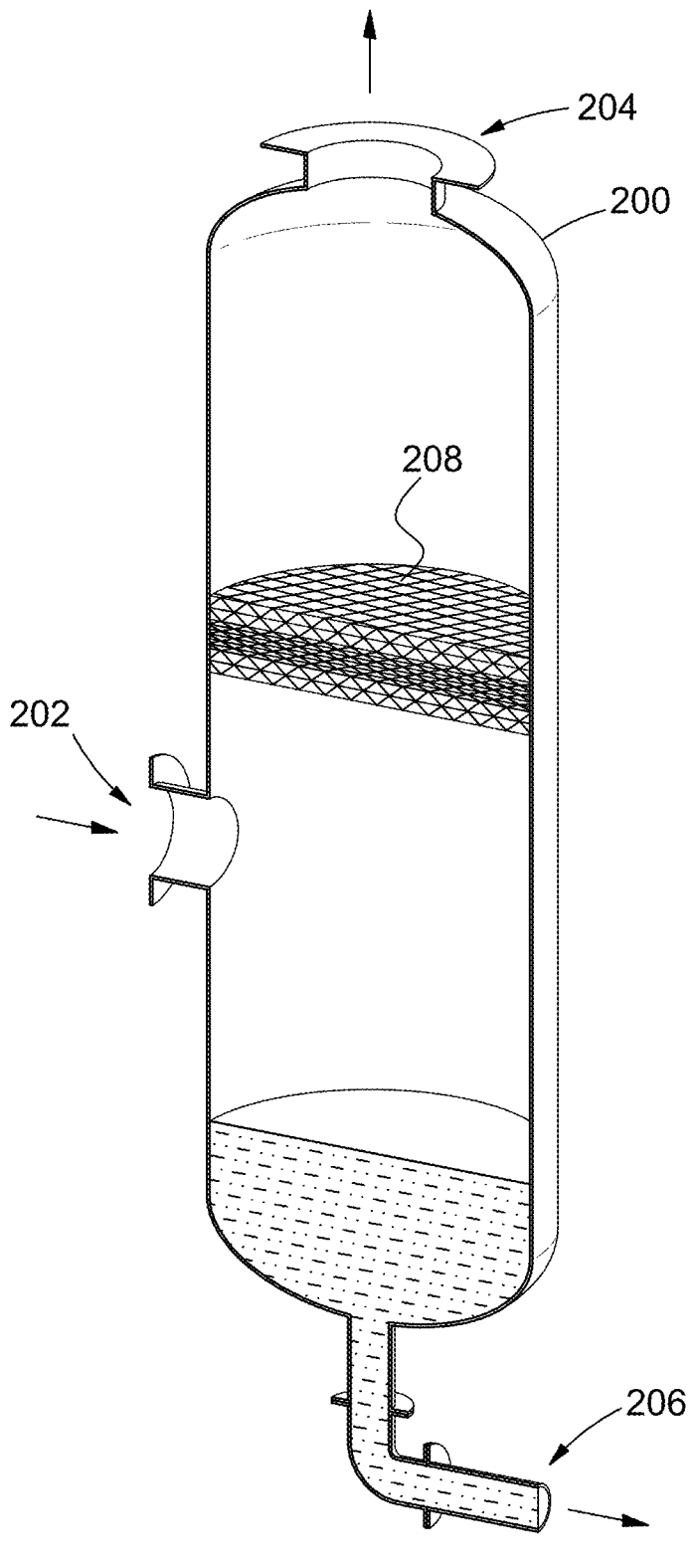
FIG. 15 is a perspective cross-section view of a separator device having a separator media comprising a woven geometric textile material constructed in accordance with the present disclosure.
Figure 16:
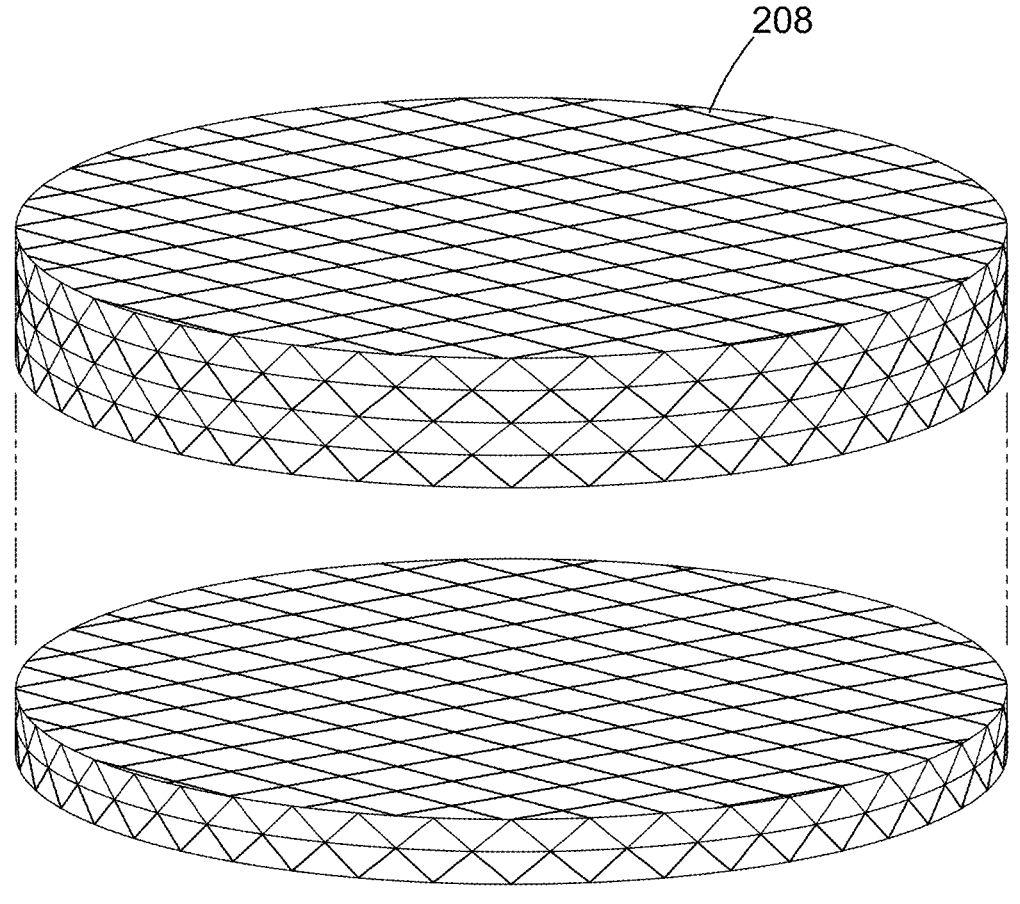
FIG. 16 is a perspective view of a separator media comprising a woven geometric textile material constructed in accordance with the present disclosure.

Referring to FIGS. 15-16, the woven geometric textile material of the present disclosure can be employed as separator media, for example within a gas processing device in an industrial gas processing system. For example, the woven geometric textile material can be incorporated in a separator device 200 (such as a knock-out drum, mist eliminator, wet scrubber, evaporator, distillation column, extractors, coalescer, or other type of separator operable to separate a liquid phase from a gas phase in a gas stream). For example, the woven geometric textile material can be employed as a separator media 208 within such a device.

The separator device 200 has a vessel 210, a gas inlet 202, a gas outlet 204 and a liquid outlet 206. The separator device 200 also includes a separator media 208 disposed within the vessel 210 between the gas inlet 202 and gas outlet 204. The gas inlet 202 is operable to receive a process gas having a gas phase and a liquid phase. The separator media 208 is operable to capture and remove the liquid phase of the process gas as described herein. The captured liquid phase exits the separator device 200 via the liquid outlet 206.

The separator media 208 is operable to clean the process gas passing through the separator device 200 by capturing and removing entrained materials in the process gas before the gas is released or sent to downstream equipment. Such entrained materials can include micron and sub-micron droplets and aerosols (e.g., a gaseous suspension of liquid and/or solid particles, including mists, fogs, fumes, smokes, or dusts, that may be soluble or insoluble in the liquid) and other entrained materials.

The separator media 208 preferably comprises one or more layers of the woven geometric textile material of the present disclosure including having a solid fraction of less than 3 percent. Where the separator media 208 comprises multiple layers of such material, the layers can be stacked such that the bottom plane 68 of an upper layer of material abuts a top plane 70 of the next lower layer of material as described herein. Additionally, or alternatively, the separator media 208 can comprise other types of material disposed between single or multiple, stacked layers of such woven geometric textile material of the present disclosure. The separator media 208 can include internal and/or external support structure between and/or around the one or more layers of the woven geometric textile material, such as a frame or other suitable support structure (not shown).

Referring to FIGS. 9-12, in an embodiment an apparatus comprising a loom 100 is provided to make woven textile materials including the aforementioned material having first and second sides, a width between the first and second sides, a length parallel to the first and second sides, a plurality of weft strands woven with a plurality of warp strands, the plurality of weft strands extending between the first and second sides, and the plurality of warp strands extending along the length of the material, the plurality of weft and warp strands comprising synthetic material, the plurality of warp strands including a set of body warp strands, a body portion disposed between the first and second sides, the body portion comprising a body weave including the body warp strands woven with the plurality of weft strands, the body weave comprising a plurality of repeating weave patterns in a grid of patterns having a plurality of rows of the repeating weave patterns across the width of the material and a plurality of columns of the repeating patterns along the length of the material, and each weave pattern of the plurality of repeating weave patterns including at least 44 body warp strands and at least 44 weft strands. After heat treatment, such material can have a solid fraction of less than 3 percent, less than 2.5 percent, and less than 2 percent.

In an embodiment, the loom 100 includes a front and a rear 102, 104 along a longitudinal length of the loom, and includes a let-up roller system 106 disposed at the rear of the loom and operable to dispense a set of warp strands 108 including the plurality of body warp strands 20.

The loom 100 has a set of harnesses 110 disposed forwardly of the let-up roller system 106. The set of harnesses 110 preferably includes a set of at least 23 (B) body harnesses 112 operable to control body warp strands for all of the plurality of repeating wave patters of the body weave 24. The set of body harnesses 112 preferably includes one body harness operable for controlling one body warp strand (e.g., a single uppermost body warp strand 16' as shown in FIG. 6) for each of the plurality of repeating weave patterns 26 of the body weave 24. The set of body harnesses 112 preferably also includes a set of at least 21 (B-2) body harnesses 112 operable for controlling pairs of body warps for each of the plurality of repeating weave patterns 26 of the body weave 24 (e.g., pairs of warp strands 16" as shown in FIG. 6). The set of body harnesses 112 preferably also includes another one body harness operable for controlling another one body warp strand (e.g., a single lowermost body warp strand 16''' as shown in FIG. 6) for each of the plurality of repeating patterns.

Each harness of the set of harnesses 110 has a plurality of heddles 114 along a lateral width of the loom, and each heddle has an eye operable to receive and guide a warp 108.

The set of harnesses 110 include a forwardmost harness 118 and a rearmost harness 120.

Each harness of the set of harnesses 110 is operable to move between an upper position 121 and a lower position 122. When each harness is in the upper position 121, a vertical position of the eyes 116 of each harness preferably increases in a direction toward the rear of the loom 100, for example in a linear manner or non-linear manner.

A vertical displacement between an eye 116' of the heddle 114' of the forwardmost harness 118 in the lower position and the eye 116" of the heddle 114" of the rearmost harness 120 in the upper position is preferably at least 6 inches (or approximately 15.24 cm).

A lay 124 is disposed forwardly of the set of harnesses 110 and has a reed 126 with a plurality of dents 128 forming a plurality of warp guides therebetween where each is operable to receive at least one of the plurality of the warp strands 108 including the body warp strands 20. The lay 124 includes a raceway 142 and can include a shuttle 144 or other suitable means to pass a weft along the raceway.

The lay 124 is operable to pivot from a rear position (FIG. 9) to a forward position (FIGS. 10 and 12), and in the forward position the lay is operable to beat a weft at a fell of the material.

The lay 124 has a warp support 128 which is disposed adjacent a bottom portion of the reed 126 and extends along the lateral length of the reed 126 between the reed 126 and the set of harnesses 110. The warp support 128 preferably has a polished top surface and is operable to support the warp strands 108 passing thereover.

The loom 110 includes a hold-down bar 130 located forwardly (i.e., downstream) of the lay 124 in the forward position (FIGS. 10 and 12) and extending across a lateral width of the reed 126 and loom. The hold-down bar 130 exerts a compressive force on a top surface the material made by the loom 100 at the fell of the material across a width of the material, to compress the material after the weaving operation.

The hold-down bar 130 has a downwardly and rearwardly-facing contact surface 132 which has a curved (e.g., convex) profile and which contacts a top surface of the material made by the loom. Preferably, the hold down bar 130 is fixed to the loom by adjustable fasteners 135 such that hold down bar is fixed during weaving operation but the position (e.g., height) and angle of the hold down bar 130 can be adjusted between operations as needed.

The hold-down bar 130 can be comprise or consist of an elongated angle bracket, for example a right-angle bracket as shown. The hold-down bar 130 can have base 146 which is fixed to a support 148 in a cantilevered manner. The base 146 can have a rearward end 150 disposed above the raceway 142 when the lay 124 is in the forward position. A flange 152 of the hold-down bar 130 can extend upwardly from the rearward end 150 of the base 146.

The base 146 of the hold-down bar 130 can be substantially planar and oriented at a rearward and downward inclined angle. The flange 152 of the hold-down bar 130 can be oriented at a rearward and upward inclined angle, for example 90 degrees relative to the base. However, other shapes and configurations of the hold-down bar 130 are possible.

The loom 100 includes a take-up system 134 disposed forwardly of the hold-down bar 130 which is operable to roll up the material woven by the loom.

An embodiment of the loom 100 is operable to weave the aforementioned woven textiles including first and second selvedges 40, 42 including materials where the body portion 22 is disposed between the first and second selvedges, each selvedge has an inner selvedge cord and an outer selvedge cord, and the inner and outer selvedge cords extend along the length of the material. The plurality of warp strands include a first set of selvedge warp strands disposed between the inner and outer selvedge cords of the first selvedge, and including a second set of selvedge warp strands disposed between the inner and outer selvedge cords of the second selvedge. Each selvedge has a selvedge weave comprising the plurality of weft strands woven with the associated inner and outer selvedge cords and the associated first and second sets of selvedge warp strands. The outer selvedge cord of each selvedge is disposed along a lateral edge of the material and the inner selvedge cord of each selvedge being disposed inwardly from the associated outer selvedge cord. The inner selvedge cord of each selvedge having a diameter substantially greater than the plurality of body warp strands, and a spacing between adjacent selvedge warp strands of the first and second sets of selvedge warp strands is greater than a spacing between the plurality of body warp strands.

The loom 100 includes a selvedge weaving system 136 operable to weave the inner and outer selvedge cords 44, 46 and the selvedge warp strands of the first and second selvedges with the weft strands. The selvedge weaving system 136 includes at least two (2) selvedge harnesses from the set of harnesses 110.

The two (2) selvedge harnesses are operable for controlling the inner and outer selvedge cords 44, 46 and the selvedge warp strands of the first and second selvedges 40, 42.

The let-up roller system 106 is operable to dispense the selvedge warp strands, and a selvedge cord spindle system 138 is disposed at or adjacent the rear 104 of the loom 100 and is operable to dispense the inner and outer selvedge cords. The selvedge cord spindle system 138 can include a pair of spindle assemblies on opposing sides of the loom each of which corresponds to one of the first and second selvedges.

The set of harnesses 110 includes a second forwardmost harness 140 disposed rearwardly of and adjacent (e.g., immediately rearwardly of) the forwardmost harness 118, and the two (2) selvedge harnesses preferably include the forwardmost and second forwardmost harnesses 118, 140. The rearmost harness 120 is preferably one of the at least 23 body harnesses.

In an embodiment, the selvedge weaving system 136 includes or consists of a first leno mechanism operable to weave the first selvedge, and a second leno mechanism operable to weave the second selvedge. The use of leno mechanism for the selvedges can reduce the number of harnesses required on the loom, for example by two. The leno mechanisms can be located between the harnesses and the fell of the woven material (e.g., rearwardly of the hold-down bar 130).

In an embodiment of a method of making the woven geometric textile material described above including the aforementioned selvedges includes providing a loom constructed in accordance with any of the above descriptions, operating the loom to produce a pre-heat-treated woven material, providing a heat treatment apparatus operable to heat treat the pre-heat-treated woven material, feeding the pre-heat-treated woven material into the heat treatment apparatus preferably in a continuous process at a fixed or variable rate (or alternatively placing/fixing the material therein), and thereby heat treating the pre-heat-treated woven material at least once by heating the pre-heat-treated woven material at a predetermined and sufficient temperature (e.g., to at least 212 degrees F., or 100 degrees C.) and for a predetermined duration such that the strand material at least reaches its plastic transition region or shrinkage temperature, to produce a post-heat-treated woven material.

The "shrinkage temperature" is a commonly used term in textile engineering when referring to the temperature at which a thermoplastic yarn begins to contract due to heat. This temperature can vary depending on the type of polymer (e.g., polyester, nylon, polypropylene) and any prior treatments the yarn has undergone (like drawing or heat-setting).

In another embodiment, the method can also include the heat treatment apparatus having selvedge holding structure operable to engage and hold the first and second selvedges at a fixed distance and to thereby maintain a width of the pre-heat-treated woven material during the step of heat treating, and the feeding step including engaging the first and second selvedges with the selvedge holding structure by manual and/or automatic means.

The method can also include the selvedge holding structure of the heat treatment apparatus including tenter pins operable to extend through the selvedge mesh to engage and hold the first and second selvedges, and the feeding step including mounting the first and second selvedges to the tenter pins.

In another embodiment, the method can also include finishing the material by removing unwanted material from the post-heat-treated material, such as all material other than the body weave, such as removing the selvedges, any gap sections between the selvedges and the body weave and any malformed sections, leaving the body weave material, and then optionally separating the body weave material into desired sizes and shapes, to produce a finished product or products.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the claimed invention.

What is claimed:

1. A woven geometric textile material comprising:

first and second sides, a width between the first and second sides and a length parallel to the first and second sides;

a plurality of weft strands woven with a plurality of warp strands, the plurality of weft strands extending between the first and second sides, and the plurality of warp strands extending along the length of the material;

the plurality of weft and warp strands comprising thermoplastic strands;

the plurality of warp strands including a set of body warp strands;

a body portion disposed between the first and second sides, the body portion comprising a body weave including the body warp strands woven with the plurality of weft strands;

the body weave comprising a plurality of repeating weave patterns in a grid of patterns having a plurality of rows of the repeating weave patterns across the width of the material and a plurality of columns of the repeating patterns along the length of the material;

each weave pattern of the plurality of repeating weave patterns including at least 44 body warp strands and at least 44 weft strands; and the body portion having a solid fraction of less than 3 percent.

2. The woven geometric material of claim 1, wherein the body portion has a solid fraction of less than 2.7 percent.

3. The woven geometric material of claim 1, wherein the body portion has a solid fraction of less than 2.6 percent.

4. The woven geometric material of claim 1, wherein the body portion has a solid fraction of less than 2.5 percent.

5. The woven geometric material of claim 1, wherein the plurality of weft and warp strands consist of polypropylene.

6. The woven geometric textile material of claim 1, further comprising:

each of the plurality of repeating weave patterns shares a body warp strand with a first adjoining repeating weave pattern and shares a weft strand with a second adjoining repeating weave pattern.

7. The woven geometric textile material of claim 6, further comprising:

the plurality of repeating weave patterns have an identical weave pattern.

8. The woven geometric textile material of claim 1, further comprising:

first and second selvedges, and the body portion being disposed between the first and second selvedges;

each selvedge having an inner selvedge cord and an outer selvedge cord, and the inner and outer selvedge cords extending along the length of the material;

the plurality of warp strands including a first set of selvedge warp strands disposed between the inner and outer selvedge cords of the first selvedge, and including a second set of selvedge warp strands disposed between the inner and outer selvedge cords of the second selvedge;

each selvedge having a selvedge weave comprising the plurality of weft strands woven with the associated inner and outer selvedge cords and the associated first and second sets of selvedge warp strands;

the outer selvedge cord of each selvedge being disposed along a lateral edge of the material and the inner selvedge cord of each selvedge being disposed inwardly from the associated outer selvedge cord;

the inner selvedge cord of each selvedge having a diameter equal to or more than 1.5 times greater than the plurality of body warp strands; and a spacing between adjacent selvedge warp strands of the first and second sets of selvedge warp strands being greater than a spacing between the plurality of body warp strands.

9. The woven geometric textile material of claim 8, further comprising:

the selvedge weave of each selvedge comprising a plain weave and having a first thickness;

the body portion having a second thickness substantially greater than the first thickness of the selvedge weave; and a diameter of the inner selvedge cord of each selvedge being between the first thickness and the second thickness.

10. The woven geometric textile material of claim 8, further comprising:

a distance between the inner selvedge cord of each selvedge and a closest body warp strand being substantially greater than a spacing between the plurality of body warp strands, wherein a gap is formed between the inner selvedge cord of each selvedge and the body weave.

11. The woven geometric textile material of claim 8, further comprising:

the inner selvedge cord having a rough exterior surface relative to the weft strands.

12. The woven geometric textile material of claim 8, further comprising:

the inner and outer selvedge cords being a color contrasting with the warp strands and weft strands.

13. The woven geometric textile material of claim 1, further comprising:

the body being a geometric mesh structure;

the geometric mesh structure comprising a woven material of a waffle-weave construction comprising repeating groups of first and second sets of strands;

the first set of strands comprising generally parallel strands which extend in substantially straight fashion in one predetermined direction;

each repeating group of strands of the first set being arranged in a generally saw-tooth cross sectional configuration whereby a thickness of the woven material is substantially equal to a height of the saw-tooth cross sectional configuration;

each repeating group of strands of the second set being arranged in a generally saw-tooth cross sectional configuration intersecting at right angles with the strands of the first set.

14. The woven geometric textile material of claim 1, further comprising:

the body portion comprising a geometric mesh structure;

the geometric mesh structure comprising a woven material having a first set of generally parallel strands extending in substantially straight fashion in one predetermined direction and a second set of strands extending at right angles to the predetermined direction;

the strands of said first set being arranged in a repeating two-dimensional cross sectional geometric pattern in which strands at the extremes of the pattern define a fabric thickness which is a multiple of at least about 44 of a diameter of a strand;

the strands of the second set also being arranged in a repeating two-dimensional cross sectional geometric pattern intersecting with the strands of the first set;

the strands of the second set, at the extremes of the geometric pattern thereof, additionally defining a material thickness which is a multiple of at least about 44 of a diameter of a strand;

the strands of the second set extending in substantially straight manner in regions between contact with strands of the first set; and the intersecting strands of the first and second sets forming a substantially non-nestable construction.

15. The woven geometric textile material of claim 1, further comprising:

the body portion comprising a geometric mesh structure comprising a first set of strands of material and a second set of strands of material;

each strand of the first set being substantially straight and parallel to every other strand in the first set;

each strand of the first set being spaced from every other strand in the first set both vertically and horizontally;

the second set of strands of material being interleaved with the first set, each of the strands of the second set being substantially parallel to every other strand in the second set;

the strands of the first set being perpendicular to the strands of the second set;

the lengths of each strand of the second set extending in interleaved fashion through the strands of the first set in a geometric orientation to fit vertical and horizontal offset spacing of each strand in the first set;

each of the strands of the second set including a plurality of substantially straight-line portions connected at angles to provide the geometric orientation; and the geometric orientation of the second set and the offset spacing of the first set giving the geometric mesh structure a thickness in cross section substantially greater than a diameter of the strands of the first and second sets of strands.

16. A separation media for use in a separation device, the separation media comprising:

a woven geometric textile material according to claim 1.

17. A separation device, comprising:

a vessel; and the separation media of claim 16 disposed within the vessel.

18. A woven geometric textile material comprising:

first and second sides, a width between the first and second sides and a length parallel to the first and second sides;

a plurality of weft strands woven with a plurality of warp strands, the plurality of weft strands extending between the first and second sides, and the plurality of warp strands extending along the length of the material;

the plurality of weft and warp strands comprising thermoplastic strands;

the plurality of warp strands including a set of body warp strands;

a body portion disposed between the first and second sides, the body portion comprising a body weave including the body warp strands woven with the plurality of weft strands;

the body weave comprising a plurality of repeating weave patterns in a grid of patterns having a plurality of rows of the repeating weave patterns across the width of the material and a plurality of columns of the repeating patterns along the length of the material;

each weave pattern of the plurality of repeating weave patterns including at least 44 body warp strands and at least 44 weft strands; and the woven geometric textile material having a flooding velocity at or above a flooding velocity profile defined by Formula 1 where a void fraction ($\varepsilon$) associated with the flooding velocity profile is at or greater than 0.97, at least in a liquid load (L) range of a gas stream of 0.001 to 0.03 m$^3$/m$^2$-s;

where Formula 1 is:

$$V_f = 0.144\varepsilon^{2.3}d_f^{-0.071}\left(1 + 3.1L^{0.5}\right)^{-1}\sqrt{\frac{\rho_L - \rho_V}{\rho_V}}$$

wherein:

$V_f$ is the flooding velocity of the woven geometric textile material;

$\varepsilon$ is the void fraction of the woven geometric textile material;

$d_f$ is a diameter of the warp and weft strands comprising the woven geometric textile material;

L is the liquid loading of the gas stream;

$\rho$L is a density of a liquid phase of the gas stream; and $\rho$V is a density of a gas phase of the gas stream.

19. The woven geometric textile material of claim 18, further comprising:

the woven geometric textile material having a fiber diameter of 0.00095 meters; and the woven geometric textile material having a flooding velocity at or above a flooding velocity profile defined by Formula 1, where the void fraction ($\varepsilon$) associated with the flooding velocity profile is at or greater than 0.97, at least in a liquid load (L) range of 0.001 to 0.03 m$^3$/m$^2$-s and where the gas stream is an air-water mixture at ambient temperature and pressure such that the density of the gas and liquid phases are about 1.204 kg/m$^3$ and 1000 kg/m$^3$, respectively.

20. The woven geometric textile material of claim 18, further comprising:

the void fraction ($\varepsilon$) associated with the flooding velocity profile is at or greater than 0.973.

21. The woven geometric textile material of claim 18, further comprising:

the void fraction ($\varepsilon$) associated with the flooding velocity profile is at or greater than 0.974.

22. The woven geometric textile material of claim 18, further comprising:

the void fraction ($\varepsilon$) associated with the flooding velocity profile is at or greater than 0.975.

23. The woven geometric textile material of claim 18, further comprising:

the body being a geometric mesh structure;

the geometric mesh structure comprising a woven material of a waffle-weave construction comprising repeating groups of first and second sets of strands;

the first set of strands comprising generally parallel strands which extend in substantially straight fashion in one predetermined direction;

each repeating group of strands of the first set being arranged in a generally saw-tooth cross sectional configuration whereby a thickness of the woven material is substantially equal to a height of the saw-tooth cross sectional configuration;

each repeating group of strands of the second set being arranged in a generally saw-tooth cross sectional configuration intersecting at right angles with the strands of the first set.

24. The woven geometric textile material of claim 18, further comprising:

the body portion comprising a geometric mesh structure;

the geometric mesh structure comprising a woven material having a first set of generally parallel strands extending in substantially straight fashion in one predetermined direction and a second set of strands extending at right angles to the predetermined direction;

the strands of said first set being arranged in a repeating two-dimensional cross sectional geometric pattern in which strands at the extremes of the pattern define a fabric thickness which is a multiple of at least about 44 of a diameter of a strand;

the strands of the second set also being arranged in a repeating two-dimensional cross sectional geometric pattern intersecting with the strands of the first set;

the strands of the second set, at the extremes of the geometric pattern thereof, additionally defining a material thickness which is a multiple of at least about 44 of a diameter of a strand;

the strands of the second set extending in substantially straight manner in regions between contact with strands of the first set; and the intersecting strands of the first and second sets forming a substantially non-nestable construction.

25. The woven geometric textile material of claim 18, further comprising:

the body portion comprising a geometric mesh structure comprising a first set of strands of material and a second set of strands of material;

each strand of the first set being substantially straight and parallel to every other strand in the first set;

each strand of the first set being spaced from every other strand in the first set both vertically and horizontally;

the second set of strands of material being interleaved with the first set, each of the strands of the second set being substantially parallel to every other strand in the second set;

the strands of the first set being perpendicular to the strands of the second set;

the lengths of each strand of the second set extending in interleaved fashion through the strands of the first set in a geometric orientation to fit vertical and horizontal offset spacing of each strand in the first set;

each of the strands of the second set including a plurality of substantially straight-line portions connected at angles to provide the geometric orientation; and the geometric orientation of the second set and the offset spacing of the first set giving the geometric mesh structure a thickness in cross section substantially greater than a diameter of the strands of the first and second sets of strands.

\*  \*  \*  \*  \*